(12) United States Patent
Campbell

(10) Patent No.: US 7,237,336 B2
(45) Date of Patent: Jul. 3, 2007

(54) CABLE MANUFACTURING METHOD

(75) Inventor: Richard Vest Campbell, Tallahassee, FL (US)

(73) Assignee: Bright Technologies, LLC, Havana, FL (US)

( * ) Notice: Subject to any disclaimer, the term of this patent is extended or adjusted under 35 U.S.C. 154(b) by 372 days.

(21) Appl. No.: 10/645,023

(22) Filed: Aug. 21, 2003

(65) Prior Publication Data

US 2004/0083607 A1     May 6, 2004

Related U.S. Application Data

(60) Provisional application No. 60/404,973, filed on Aug. 21, 2002.

(51) Int. Cl.
    *H01R 43/04* (2006.01)
(52) U.S. Cl. .............. 29/867; 29/828; 29/857; 29/861
(58) Field of Classification Search ........... 29/857, 29/861, 867
    See application file for complete search history.

(56) References Cited

U.S. PATENT DOCUMENTS

| | | | |
|---|---|---|---|
| 1,396,903 A | * | 11/1921 | Weber .................. 30/90.6 |
| 3,748,932 A | * | 7/1973 | Neiman et al. .......... 81/9.51 |
| 5,226,224 A | * | 7/1993 | Ishizuka et al. .......... 29/825 |

* cited by examiner

*Primary Examiner*—Richard Chang
(74) *Attorney, Agent, or Firm*—John Wiley Horton

(57) ABSTRACT

A method of manufacturing a cable assembly using stranded cable material. A manufacturing jacket is placed over the cable to hold the strands in a desired state. A length of jacketed cable is then cut to a desired length. Appropriate terminations are slipped over the manufacturing jacket on the cable's first end, its second end, or at some intermediate point. For a typical type of termination, a short portion of the manufacturing jacket is stripped away at the point of termination to expose the strands. After the terminations are placed in the appropriate position, potting compound or other mechanical means are typically applied to lock the terminations to the exposed lengths of strands. A completed cable assembly is thus created. However, the presence of the manufacturing jacket, while highly desirable for manufacturing, is often undesirable for end use. All of the manufacturing jacket, or in some instances a substantial portion thereof, is therefore removed, using a variety of disclosed methods, to form an unjacketed cable. A variety of techniques are disclosed for carrying out these steps, including the use of modified terminations and modified jackets. The finished product may have no jacket at all, a partial jacket, or a jacket which is different from the one used in the manufacturing process.

9 Claims, 45 Drawing Sheets

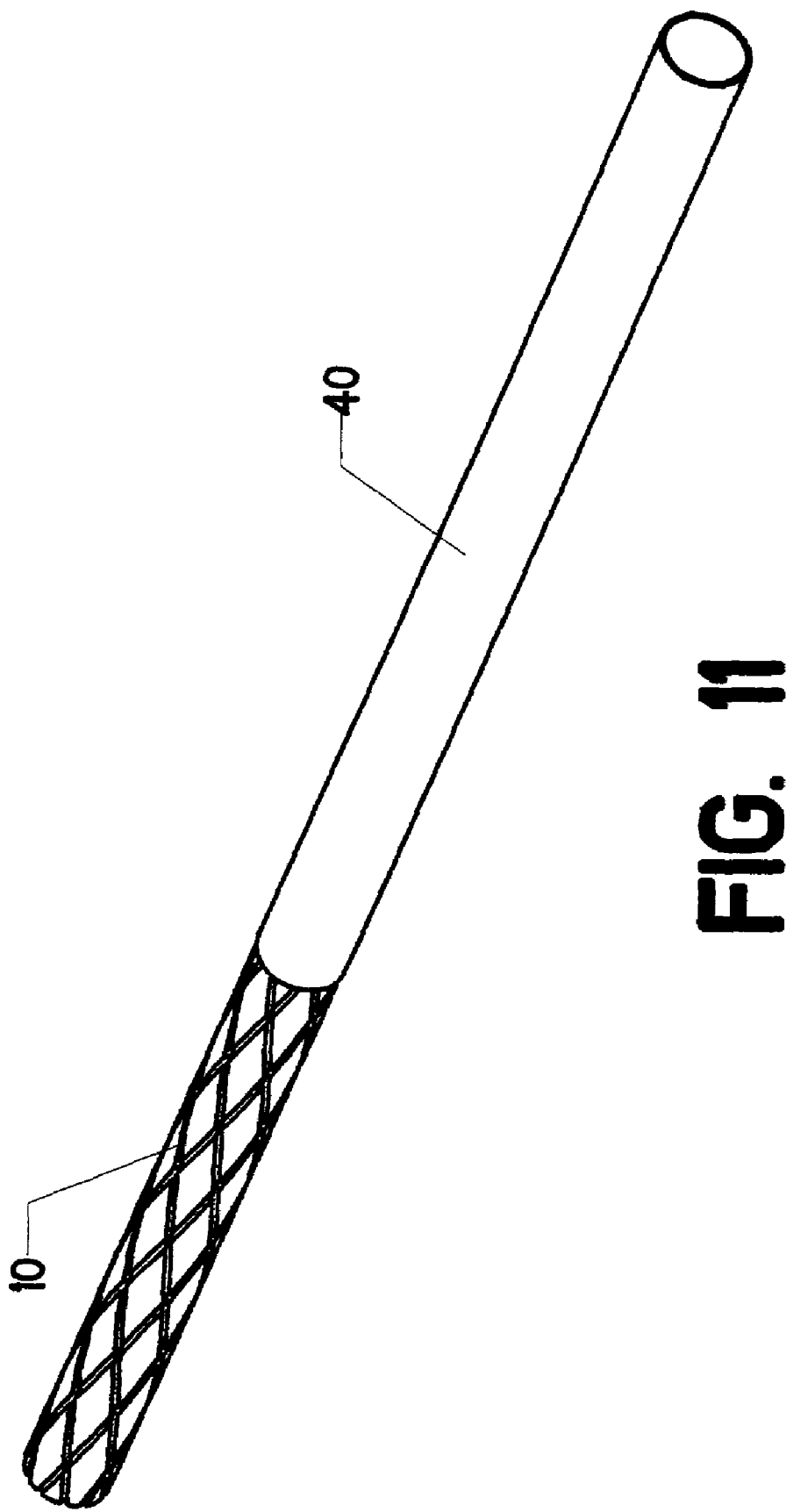

CABLE MANUFACTURING METHOD

CROSS-REFERENCES TO RELATED APPLICATIONS

This is a non-provisional application which claims the benefit of an earlier-filed provisional application pursuant to 37 C.F.R. §1.53(c). The earlier application was filed on Aug. 21, 2002, and was assigned Ser. No. 60/404,973.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of cables. More specifically, the invention comprises a manufacturing method which allows the automation of previously manual processes, as well as providing a superior end product.

2. Description of the Related Art

Ropes and cables have been traditionally made of natural fibers or metals. These would include wire rope and hemp "hawsers." In the last half century, synthetic fibers such as NYLON and polyester have been commonly used to replace natural fibers. NYLON and polyester ropes have been used for low tension applications, whereas wire ropes (typically steel) have been used for high tension applications.

Those skilled in the art will know that wire rope behaves very differently from NYLON or polyester rope. Though it is stronger for a given cross section, it is also very stiff. If a wire rope is kinked, the constituent strands may undergo plastic deformation—permanently damaging the rope. Thus, wire ropes must be fed around large radius pulleys, pins, or capstans and must otherwise be protected from kinking. Those skilled in the art will also know that wire rope is susceptible to corrosion, typically rusting, as well as fatigue. It is also quite heavy. Thus, there has long been the desire to obtain the high-strength properties of wire rope without its inherent stiffness and weight.

In recent years, progress has been made in this regard. Advanced synthetic fibers have come onto the market in addition to the older synthetic fibers. These fibers include KEVLAR, VECTRAN, ZYLON, and SPECTRA, to name a few. These advanced synthetic fibers typically have smaller diameters for the individual fibers that was common for the older materials—though this is not always the case.

FIG. 1 shows a stranded cable 10. It includes a stranded core 14, composed of a cluster of parallel strands. Surrounding stranded core 14 is braided strand jacket 12. Although the individual strands are depicted as being substantial in size, the reader should appreciate that they are often very small—having the diameter of a human hair or even less. Within the cabling industry, the individual constituents within a bundled cable are called "fibers" or "strands." Some publications use "strands" for metal constituents and "fibers" for non-metallic constituents. Throughout this disclosure, the term "strands" will be used to describe both metallic and non-metallic constituents.

Braided strand jacket 12 is used, among other purposes, to contain the parallel strands within strand core 14. In its absence, stranded core 14 can become disorganized. Those skilled in the art will know that the style of weave shown in FIG. 1 is one of dozens in common use. In some cases, the entire cross section of a cable is formed by sets of helical wrappings as shown for braided strand jacket 12.

In order to be useful, any cable must be terminated. That is, any cable must have attachments provided on its two ends (or sometimes at one or more intermediate points) to transmit a tensile load. In the simplest form, these terminations can simply be tying the cable to attachment cleats by knotting or looping. In order to maximize the strength of the completed assembly, however, more efficient terminations are desirable. Such terminations can also facilitate connection of the cable via threads, grommets, eyes, snapping features, etc.

FIG. 2 shows one type of termination. Anchor 16 has been affixed to the end of stranded cable 10. Anchor 16 incorporates loading flange 20. In operation, anchor 16 would be passed into a grommet, so that loading flange 20 can bear against a mating surface and place tension on the cable. Numerous other types of terminations are known, including hooks, threaded fasteners, eye fittings, button studs, clevis fittings, etc.

FIG. 3 shows stranded cable 10 from the top and from the side, with the side view having a partial section to reveal the internal details of this particular type of termination. The reader will observe that tapered bore 18 passes completely through anchor 16. One method of locking the termination in place is as follows: Strands 22 of stranded cable 10 are splayed within tapered bore 18. Potting compound 24—typically high strength resin—is then poured into tapered bore 18. Once potting compound 24 solidifies, strands 22 are locked within tapered bore 18.

Of course, potting is not the only method used to affix terminations. The present invention applies to both potted and non-potted terminations. Other methods of affixing terminations include compression fittings and mechanically swaged fittings. However, as potting is a quite common method, most of the examples are presented for use with the potting approach.

Potting is carried out in a variety of ways. Where the use of very fine strands makes wetting difficult, it may be desirable to wet the strands while they are exposed and loose. Anchor 16 is then pulled over the wet strands. The liquid potting compound is then allowed to harden. Whatever potting method is used, the result after hardening is shown in FIG. 3. Loading flange 20 may then be used to put tension on stranded cable 10 without pulling the strands free of anchor 16. FIG. 4 shows the result with anchor 16 removed for visual clarity. The tapered shape of potted region 32 locks it in place. Although a conical shape for tapered bore 18 has been illustrated, many different shapes can be used, so long as they generally expand from left to right in the view as shown, or have ribs or other features which will mechanically engage the potted strands.

Those skilled in the art will know that the alignment of the strands in the finished termination is important to the ultimate strength, stiffness, fatigue resistance, and working life of the stranded cable. The typical goal is to maximize the maximum allowable stress of the completed assembly as a percentage of the maximum allowable stress of one of the individual strands (In other words, the load should be evenly distributed among the strands).

One factor influencing the result is the nature of the transition from the freely flexing portion of the cable to the region locked within a termination (In this case—potted region 32). FIG. 5 shows this transition as termination plane 34. Termination plane 34 is ideally perfectly orthogonal to the central axis of stranded cable 10, meaning that the anchor attached is perfectly parallel to the central axis of stranded cable 10.

Prior art techniques for creating a terminated cable often manage to generally align the termination with the bundle of strands. However, because the strands are free to shift around, it is often true that some strands have more slack along their length than others. Once the terminations are attached, the result is that some strands within the stranded cable are slightly longer then others. When the cable is loaded in tension, the load will be initially transferred to the shortest strands. The shorter strands can overload and break. This causes a cascading failure as the load is carried by fewer and fewer strands. Thus, the load-carrying ability of the stranded cable will be compromised.

The individual strands within stranded cable 10 are also often difficult to process. Although they can be cut using a metal blade, many strands are not cut easily (NYLON and polyester being notable exceptions). The cable as a whole will tend to smash flat or flare out under the cutting knife and deform. Thus, traditional cutting methods may produce varied results. Cutting and terminating processes on stranded cables are also made difficult by the following additional factors:

1. The strands along the length of the cable can easily shift or snag during production processes, thereby causing misalignments;

2. The accurate positioning and application of a temporary localized binding mechanism (such as tape or bundling string) is difficult (explained in more detail subsequently). The length between the binding mechanism and the end of the cable is critical for properly creating the termination. Thus, the inability to accurately position the binding mechanism introduces error;

3. The addition of a localized binding mechanism causes an increased overall diameter, which may snag on machinery, feed holes, terminations, or the like;

4. A temporary localized binding mechanism is generally unable to bind the strands tightly. It is also difficult to maintain a predictable outer diameter. This fact means that bores through the terminations must be oversized. The result is a sloppy fit between the termination and the strands;

5. The individual strands are so small that they tend to wedge between opposing cutter knives rather than shearing;

6. The stranded cable often has little stiffness in compression, meaning that it cannot be reliably fed into a hole, holding device, or termination by pushing;

7. When a stranded cable is cut, many strands on the outside will fray and catch on moving equipment, feeding devices, terminations, feed holes, and the like;

8. The strands themselves are often very slick, making it difficult to control movement and to accurately measure length (because of slippage in the measurement device);

9. The stranded cable tends to flatten when passed around drive capstans and similar hardware, meaning that a constant diameter is not maintained; and 10. In order to cut the stranded cable to a consistent length, it is commonly placed under tension. When the cut occurs, a "snap back" can result. And, of course, not all the strands are cut in the same instant. When the first are cut, these snap back and the load on the remaining strands increases. Since tension is maintained approximately constant for the stranded cable as a whole, the remaining strands elongate before they are cut. The result is that the strands have different lengths, and may be displaced.

FIG. 6 shows one approach to the problem of cutting a stranded cable. Stranded cable 10 is wrapped with tape 28 (a form of localized binding mechanism) at the point where it is to be cut. Tape wrap 26 binds the cable and keeps the strands somewhat aligned. The alignment function is restricted, however, as the tape only holds the strands in the position they occupied just prior to its application. The strands may have become quite misaligned by this point, through handling and spooling of the stranded cable. Even a small bend in the cable can produce significant misalignment.

FIG. 7 shows knife 30 cutting stranded cable 10. Such a shearing action is appropriate in some circumstances. An angled guillotine type blade is also commonly used. FIG. 8 shows a possible result: Sheared surface 36 is not perpendicular to the central axis of stranded cable 10. In addition, the reader will observe that the round cross section has been deformed into an oval at sheared surface 36.

A thorough and tight taping job can minimize these deformations. With manual skill, a technician can in fact produce a perpendicular cut without substantially deforming the stranded cable. However, despite these efforts, the cable may still contain strands having unequal overall lengths. The strands may also be misaligned. Although sheared surface 36 may tend to "relax" into a more perpendicular and round shape, the discrepancies in strand length will remain. The repeatability of such manual processes is limited. Thus, it is difficult to predict the ultimate physical strengths and other properties of a cable manufactured using these prior art techniques.

In order to complete the termination process, additional steps must be performed. A termination is slipped over the tape and slid down the cable a short distance. The tape is then removed to expose the end strands. A second taping is applied at the position where the strands enter the termination. The exposed end strands are then potted into the termination.

The taping and re-taping process is obviously labor intensive. It also requires a skilled employee. FIG. 9 shows a resulting termination in cross section. The bore through the termination must be made oversized to allow for the inconsistent diameter, fiber misalignment, and lack of concentricity of the taped cable. The reader will observe that anchor 16 is not properly aligned with the centerline of the stranded cable. The assembly in FIG. 9 is obviously an undesirable result. The shortcomings of the taping example presented are also true when using other manual binding processes.

BRIEF SUMMARY OF THE INVENTION

A method of manufacturing a cable assembly using stranded cable material. A manufacturing jacket is placed over the cable to hold the strands in a desired state. A length of jacketed cable is then cut to a desired length. Appropriate terminations are slipped over the manufacturing jacket on the cable's first end, its second end, or at some intermediate point. For a typical type of termination, a short portion of the manufacturing jacket is stripped away at the point of termination to expose the strands. After the terminations are placed in the appropriate position, potting compound or other mechanical means are typically applied to lock the terminations to the exposed lengths of strands. A completed cable assembly is thus created. However, the presence of the manufacturing jacket, while highly desirable for manufacturing, is often undesirable for end use. All of the manufacturing jacket, or in some instances a substantial portion thereof, is therefore removed, using a variety of disclosed methods, to form an unjacketed cable. A variety of techniques are disclosed for carrying out these steps, including the use of modified terminations and modified jackets. The finished product may have no jacket at all, a partial jacket, or a jacket which is different from the one used in the manufacturing process.

BRIEF DESCRIPTION OF THE SEVERAL
VIEWS OF THE DRAWINGS

FIG. 11 is an isometric view, showing a stranded cable with a jacket.

Figure 1:
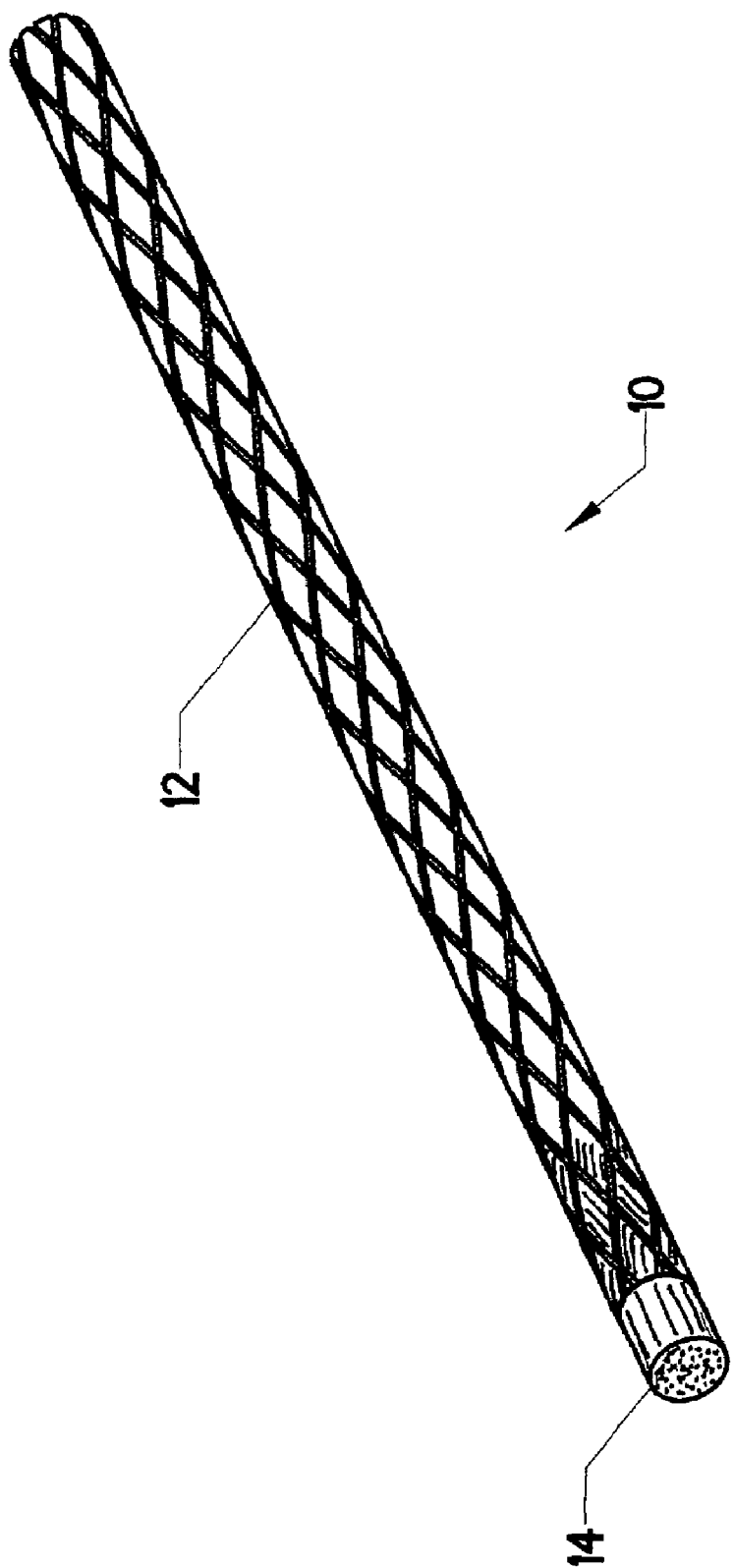
FIG. 1 is an isometric view, showing a prior art stranded cable.
Figure 2:
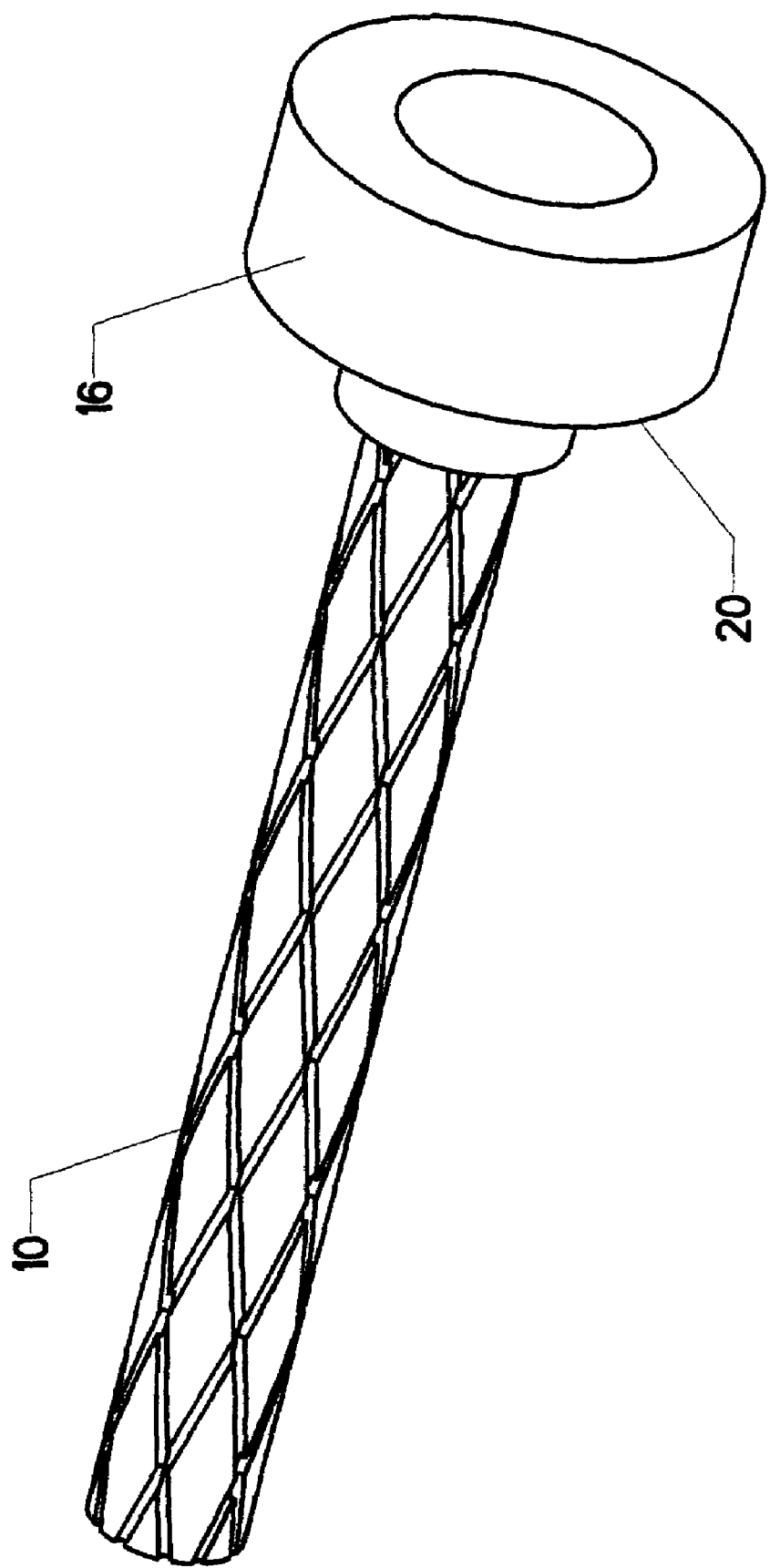
FIG. 2 is an isometric view, showing a prior art termination.
Figure 3:
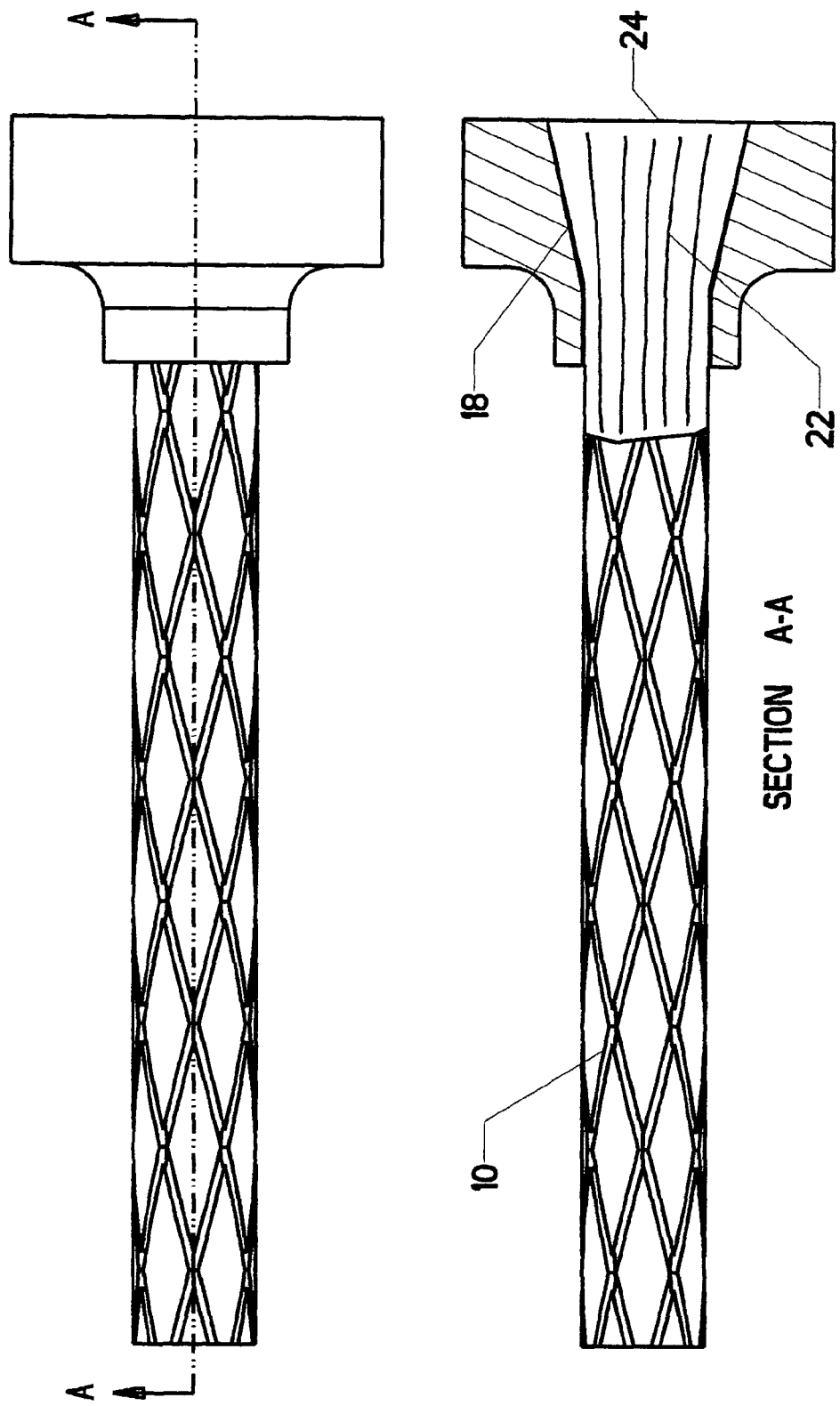
FIG. 3 is an isometric view, showing a prior art termination.
Figure 4:
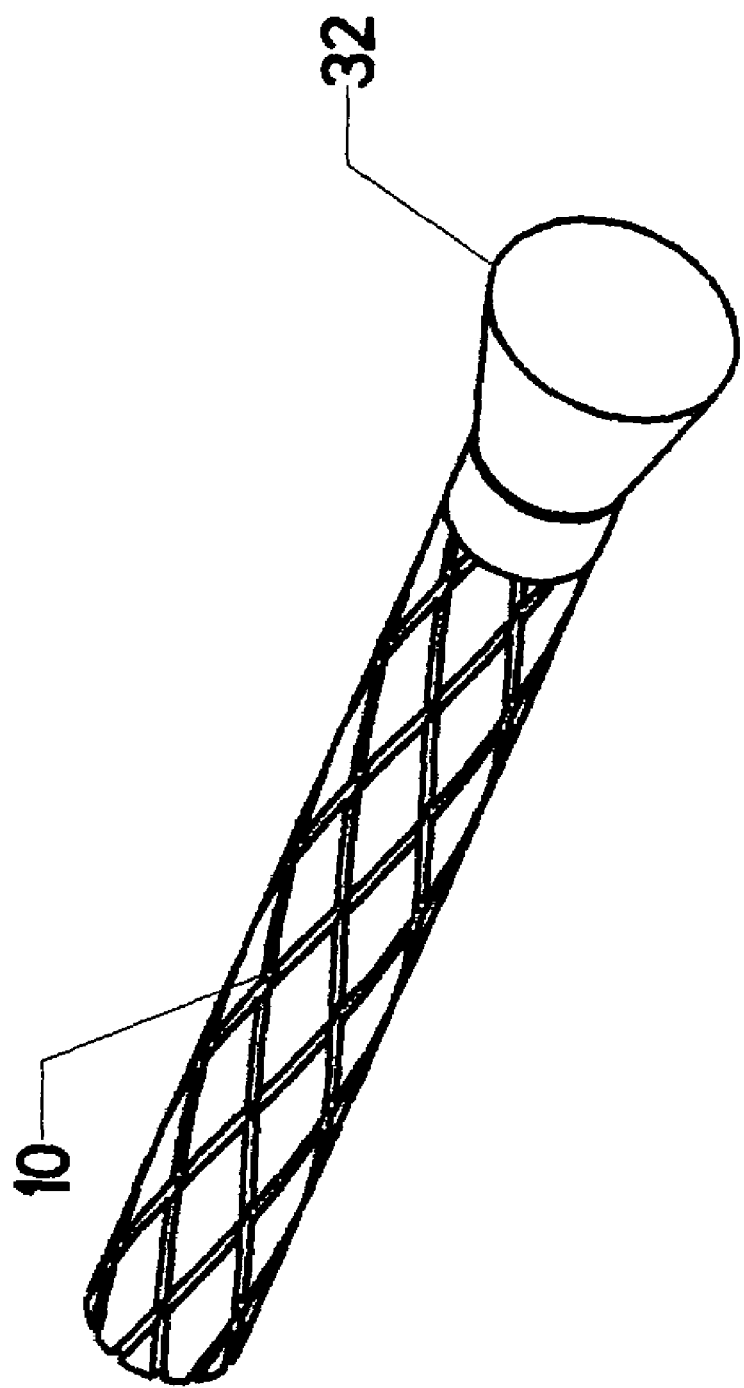
FIG. 4 is an isometric view, showing a prior art termination.
Figure 5:
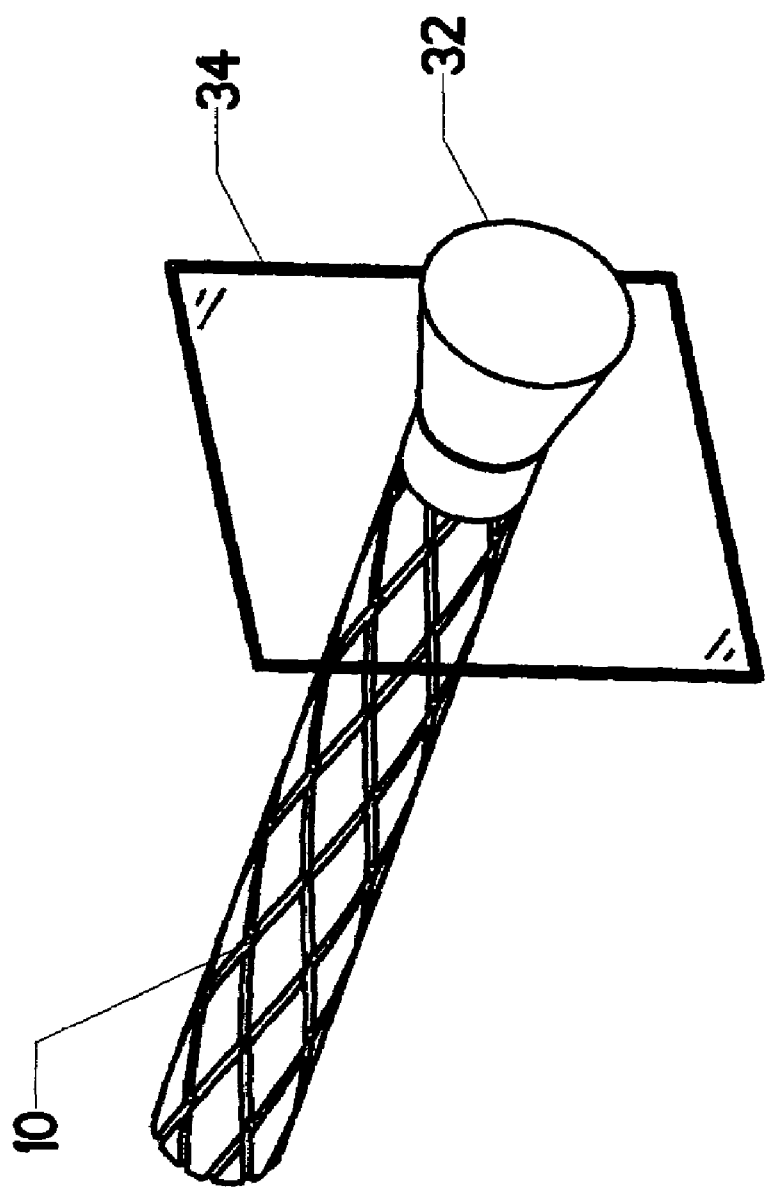
FIG. 5 is an isometric view, showing a prior art termination.
Figure 6:
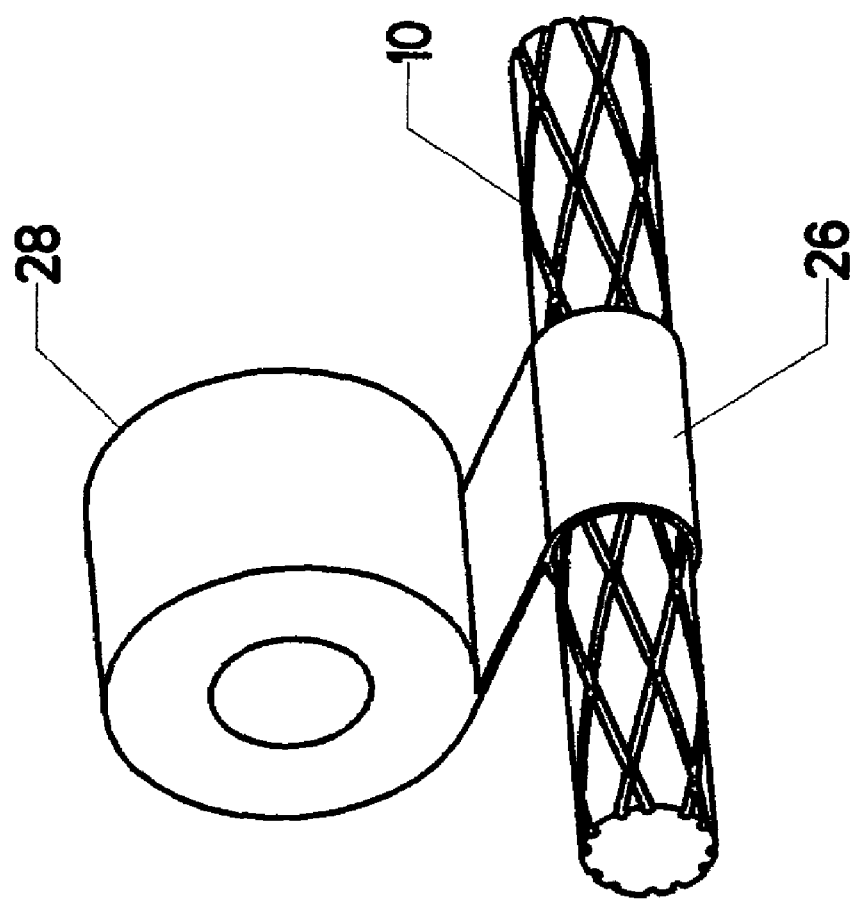
FIG. 6 is an isometric view, showing how a stranded cable is cut to length.
Figure 7:
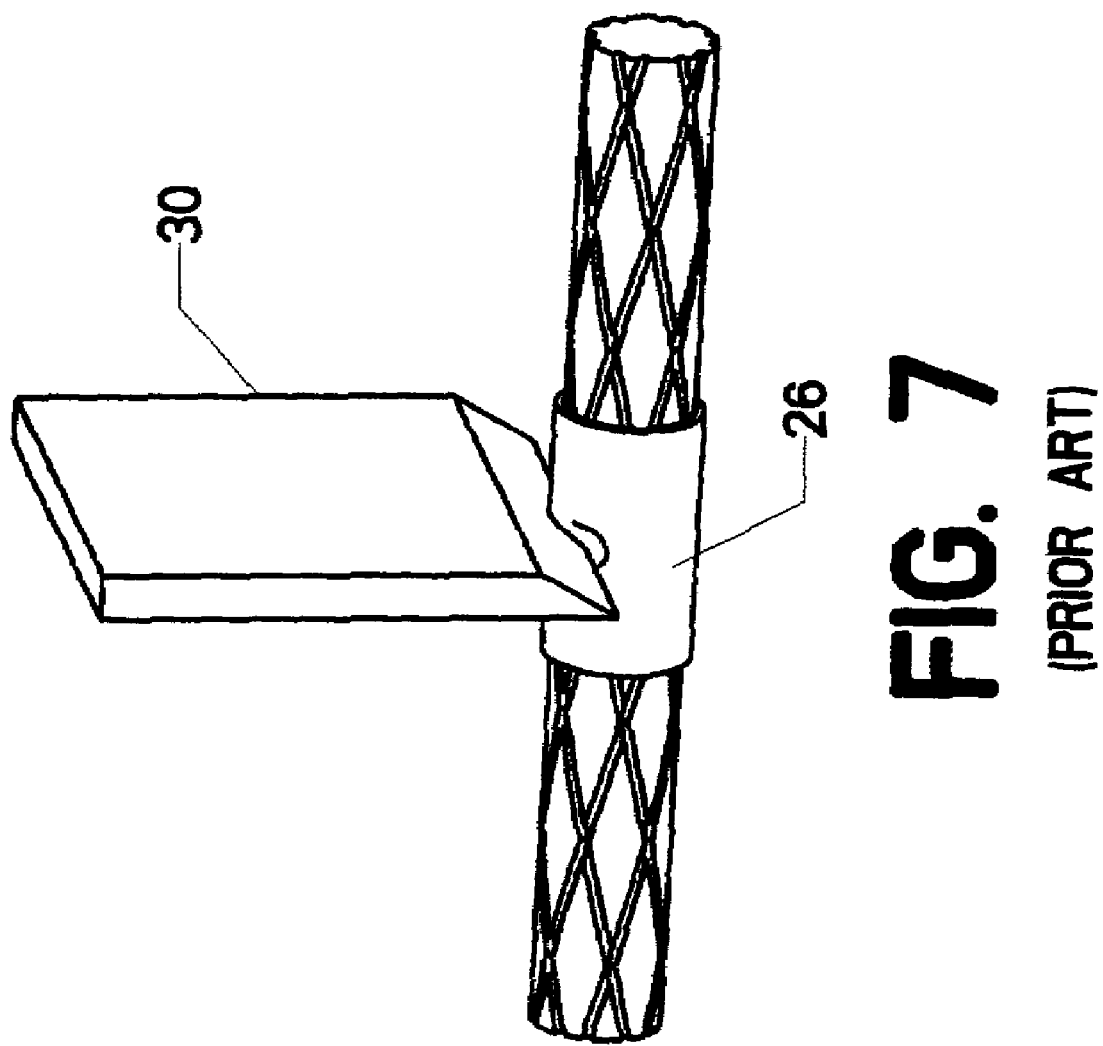
FIG. 7 is an isometric view, showing how a stranded cable is cut to length.
Figure 8:
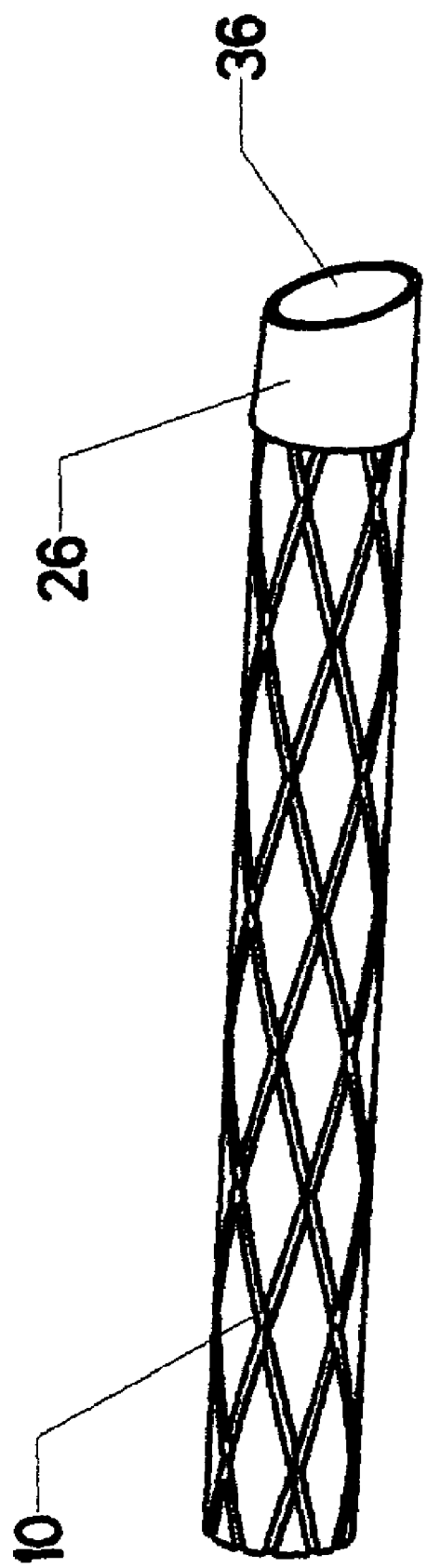
FIG. 8 is an isometric view, showing a stranded cable cut to length.
Figure 9:
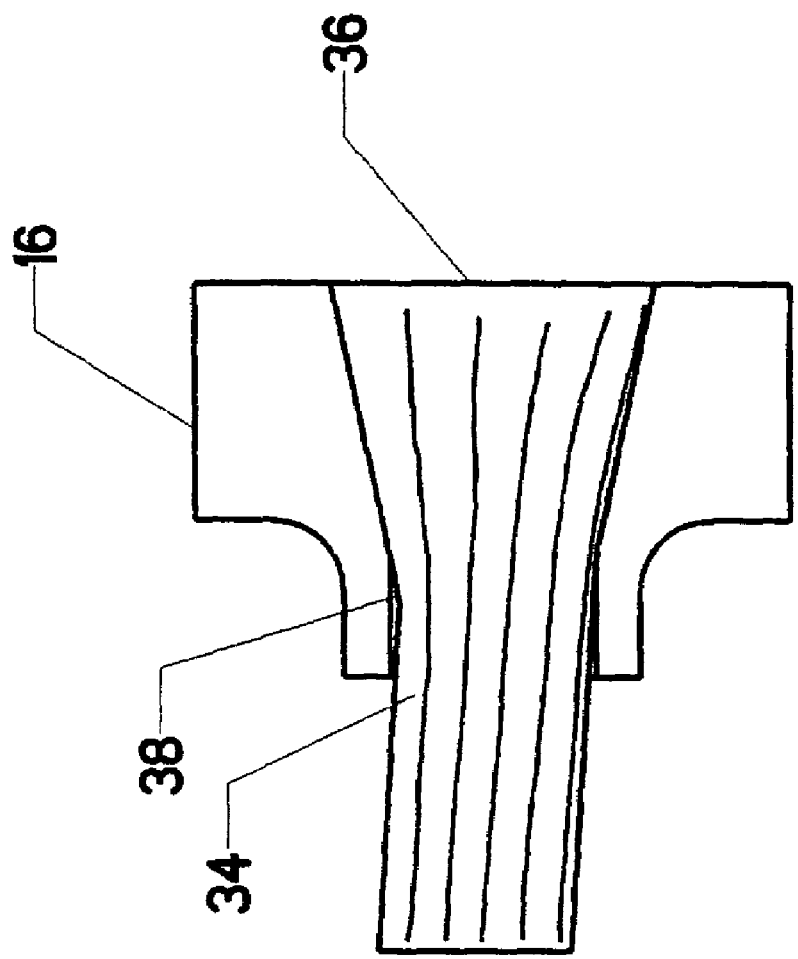
FIG. 9 is an isometric view, showing a prior art termination.

| REFERENCE NUMERALS IN THE DRAWINGS | |
|---|---|
| 10 stranded cable | 12 braided strand jacket |
| 14 stranded core | 16 anchor |
| 18 tapered bore | 20 loading flange |
| 22 strands | 24 potting compound |
| 26 tape wrap | 28 tape |
| 30 knife | 32 potted region |
| 34 termination plane | 36 sheared surface |
| 38 gap | 40 manufacturing jacket |
| 42 extruding head | 44 plastic infeed |
| 46 plastic manifold | 48 vee knife |
| 50 cutting fixture | 52 trough |
| 54 knife slot | 56 guillotine |
| 58 straight knife | 60 collar |
| 62 fillet | 64 stripper knife |
| 66 clamping mandrel | 68 rotary cutter |
| 70 cable assembly | 72 axial slit |
| 74 unjacketed cable assembly | 76 extruded slit |
| 78 extruded flap | 80 cable orifice |
| 82 jacket annulus | 84 slit former |
| 86 flap former | 88 feed tube |
| 90 rib | 92 channel |
| 94 helical slit | 96 radial slit |
| 98 freed section | 100 splayed strands |
| 102 jacket recess | 104 dimple |
| 106 protrusion | 108 O-ring |
| 110 O-ring groove | 111 center anchor |
| 112 exposed strands | 114 top half |
| 116 bottom half | 118 loading eye |
| 120 cone | 122 cone receiver |
| 124 compression cap | 126 clamp |
| 128 vat | 130 liquified jacket material |
| 132 spray head | 134 wrapped jacket |
| 136 shrinkable jacket | 138 heat application point |
| 140 grinding surface | 142 fractured jacket |
| 144 melted jacket | 146 sealing interface |

DESCRIPTION OF THE INVENTION

Central to this invention is the concept of enclosing stranded cable 10 with a manufacturing jacket in order to retain the strands comprising the cable in a desired state. Throughout this disclosure, it will be understood that the term "stranded cable" is used generally to describe a cable made of many strands having diameters smaller than the diameter of the stranded cable itself. The tem is intended to encompass wire rope (steel cable) as well. In other words, the term "strand" is used to describe cable constituents made of any substance, whether natural, synthetic, or metallic.

Additional definitions may be helpful to the reader. Within the art, the terms "cable" and "rope" are used to describe a tensile member made from a bundle of smaller tensile members. The terms are used interchangeably in this disclosure. Likewise, the terms "termination" and "anchor" are used in the art to describe an attaching element placed on a cable or rope (generally at one end, but sometimes at an intermediate point). These two terms are also used interchangeably in this disclosure.

Figure 10:
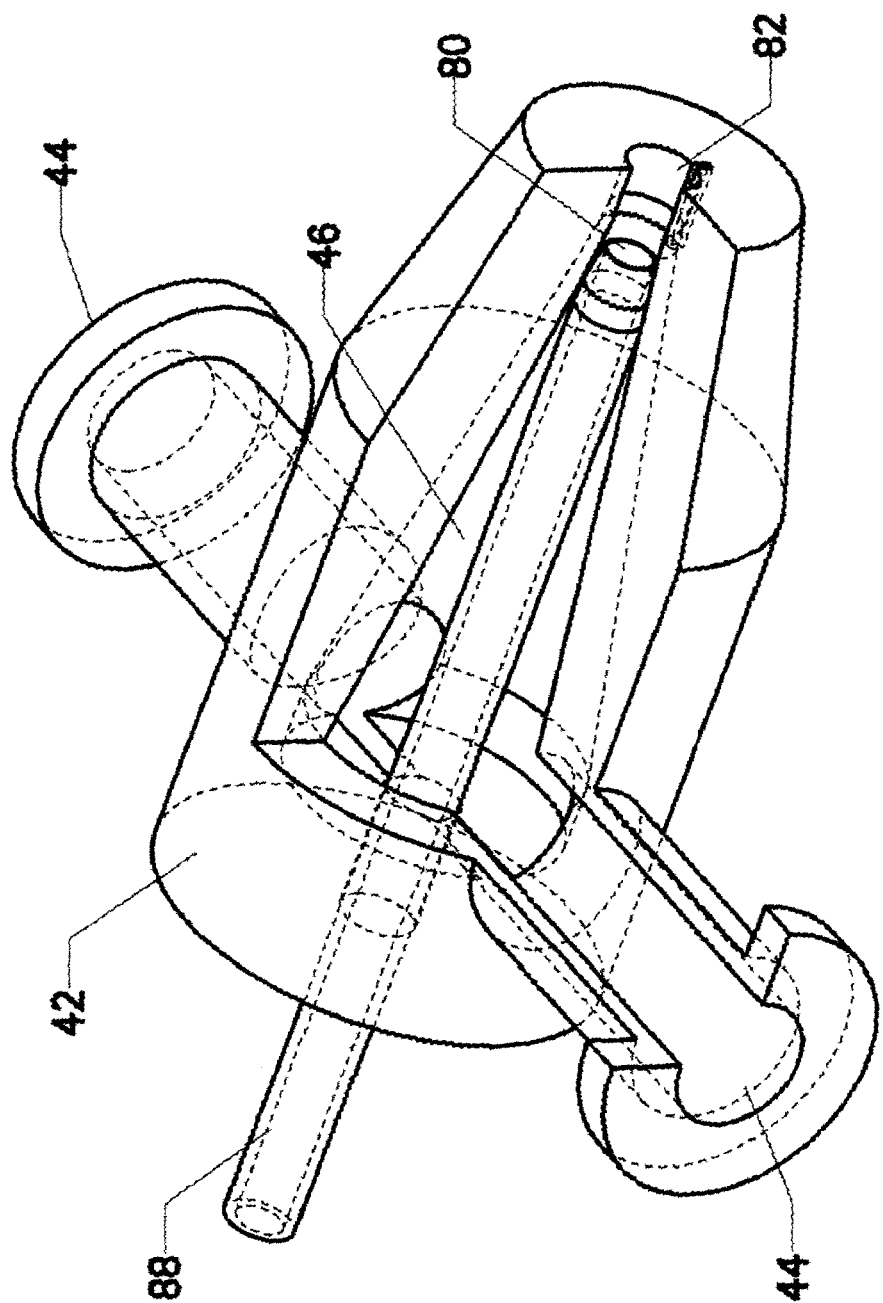
FIG. 10 is an isometric view, showing a prior art extruding head.

The step of enclosing a stranded cable with a manufacturing jacket can be accomplished in a variety of ways. These would include braiding, weaving, dipping, and spraying. Extrusion of the jacket directly over the cable is also quite common. FIG. 10 illustrates the hardware used for this purpose—extruding head 42. This type of device is known in the prior art.

Stranded cable 10 is fed through feed tube 88, ultimately coming out through cable orifice 80. Stranded cable 10 is pulled through the device from left to right, as shown in the view. It is typically pulled through under tension, so that its cross-sectional position and diameter remains stable. A common coating for stranded cable 10 would be thermoplastic material. A mass of thermoplastic material, in its molten liquid state, is fed into extruding head 42 through a pair of plastic infeeds 44. From there, the molten material enters plastic manifold 46.

Plastic manifold 46 narrows down to jacket annulus 82. At this point, the molten material is forced onto the moving surface of stranded cable 10. It adheres to the surface (or in some cases simply overlays the surface and mechanically interlocks with the strands) and is drawn out of the device to the right. The moving jacketed stranded cable 10 then undergoes a rapid cooling stage, usually through the use of a stream of running water. It emerges from the cooling stage with the thermoplastic jacket having hardened on its exterior surface.

The molten jacket material is supplied by one or more heated auger feeders, such as are commonly used in injection molding machines. These devices are well known to those skilled in the art. Likewise, the tension maintaining spools and wrapping capstans are well known. As these devices are not material to the novel aspects of the invention, they have not been illustrated. Nevertheless, the reader will appreciate that through the operation of extruding head 42, a long and continuous length of stranded cable 10 can be coated with a thermoplastic jacket.

FIG. 11 shows a stranded cable with a jacket 40 extruded over a portion of its length. The reader will note that the "unjacketed" portion of the cable actually has a braided strand jacket 12 over a parallel core of strands. It is "jacketed" in the sense that it has no manufacturing jacket. The braided strand jacket does provide some stability to the strands making up the cable. It commonly does not, however, provide the level of stability and processability supplied by a manufacturing jacket. Thus, it is advantageous to apply a manufacturing jacket to a cable already having a jacket in place, as well to cables having no jacket at all.

Throughout this disclosure, the term "manufacturing jacket" will be used to describe a jacket which is added for the manufacturing process and subsequently partially or totally removed. The term "jacket" standing alone will be used to describe the prior art braided, woven, extruded, stranded, or other types of jackets.

The reader should be aware that the extruding process described is but one method among many of depositing a manufacturing jacket over a cable. Those skilled in the art will also know that a manufacturing jacket could be applied by these additional methods, as well as others: (1) applying a length of shrinkable tubing; (2) dipping the cable through a vat of liquified jacket material; (3) braiding, twisting, or otherwise interlocking the manufacturing jacket material over the core; 4) wrapping or rolling a tape or sheet around the cable; (5) spraying a hardening material onto the cable; (6) molding a material around the cable; (7) helically winding a string or wire around the cable; (8) passing the cable through the interior of a mechanically-expanded manufacturing jacket which is then released or mechanically compressed over the cable; (9) Swaging or otherwise compressing a length of tubular material over the cable; and (10) Applying a material which is subsequently heated to melt or fuse onto the cable. The inventive process disclosed herein is not dependent upon the use of any particular type of manufacturing jacket-forming process.

Figure 37:
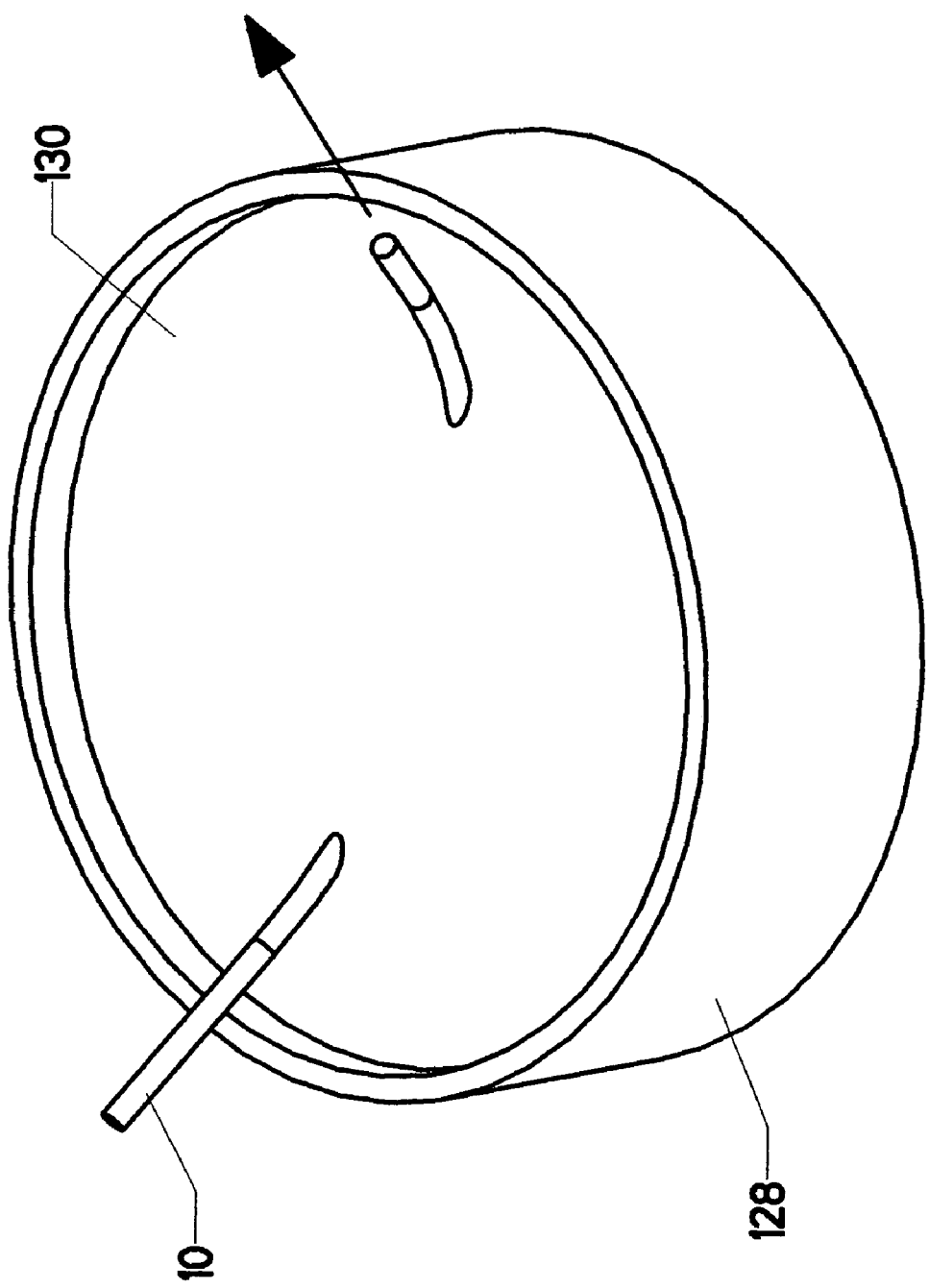
FIG. 37 is an isometric view, showing the formation of a jacket by dipping.
Figure 38:
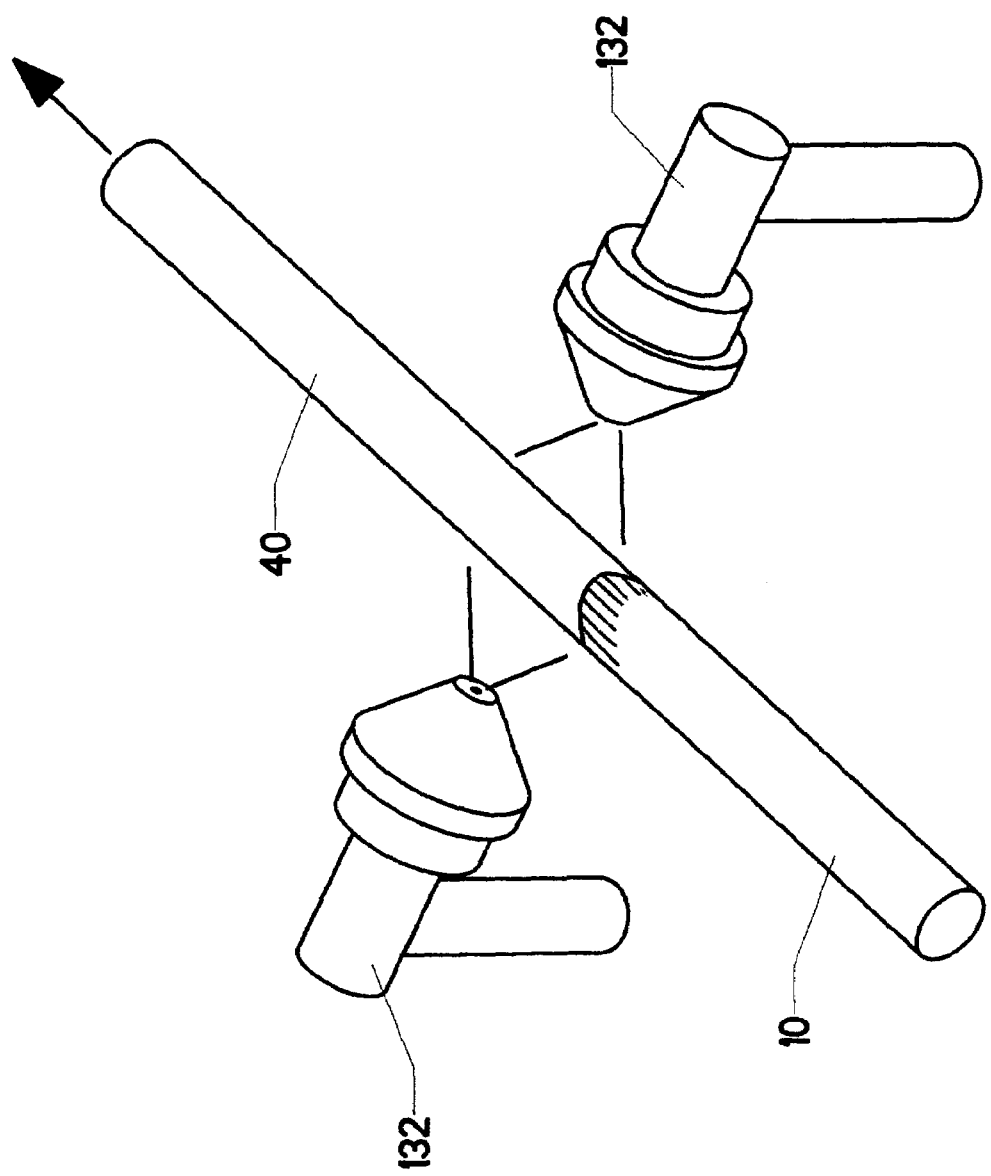
FIG. 38 is an isometric view, showing the formation of a jacket by spraying.

FIG. 37 shows the addition of a manufacturing jacket using a dipping process, with stranded cable 10 moving through liquified jacket material 130 contained in vat 128. FIG. 38 depicts the addition of a manufacturing jacket via spraying. The cable is moved past one or more spray heads 132. These spray a liquified form of jacket material, which accumulates on the surface of the cable and then solidifies to form the manufacturing jacket.

Figure 32:
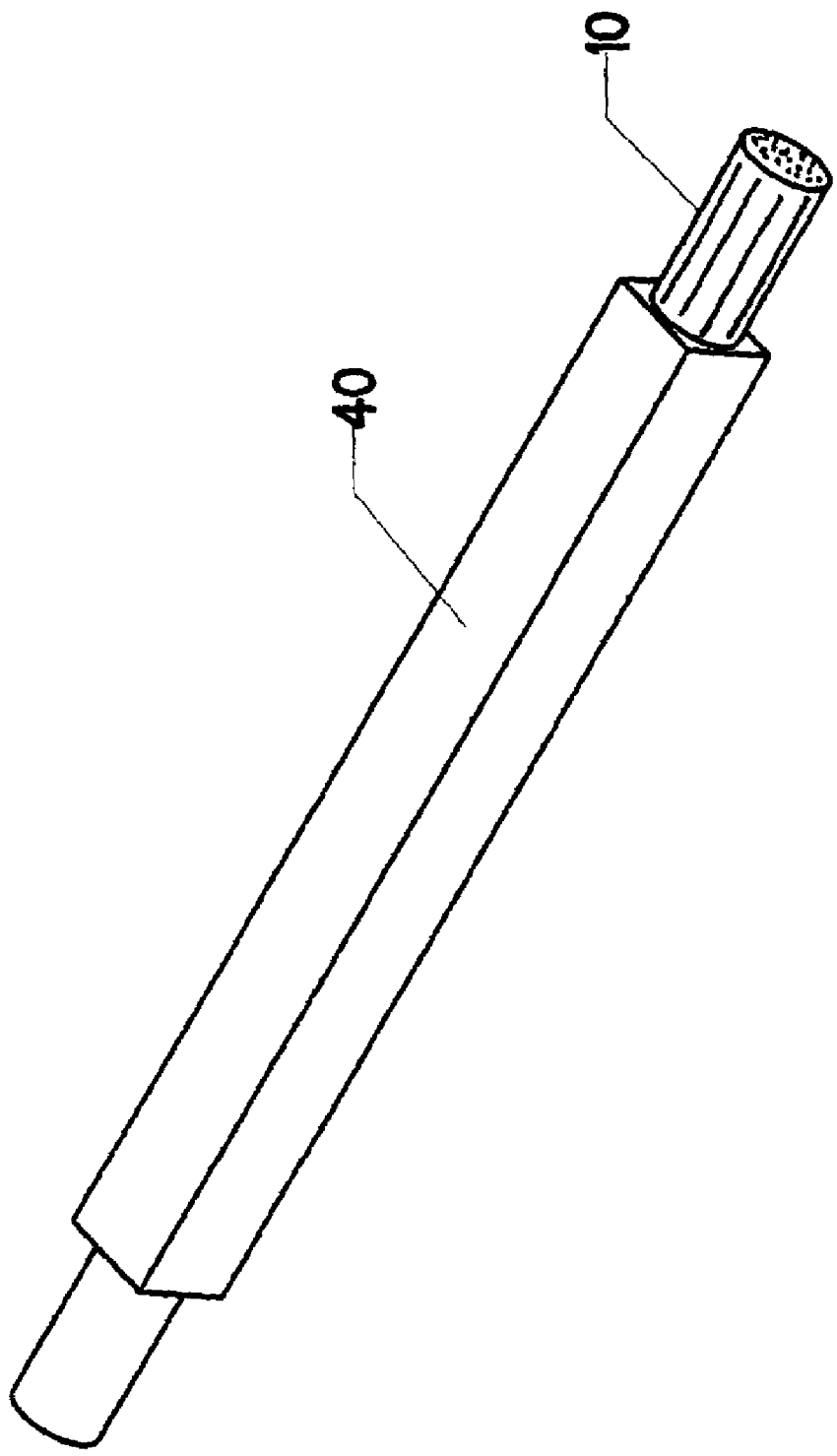
FIG. 32 is an isometric view, showing an alternate jacket.
Figure 39:
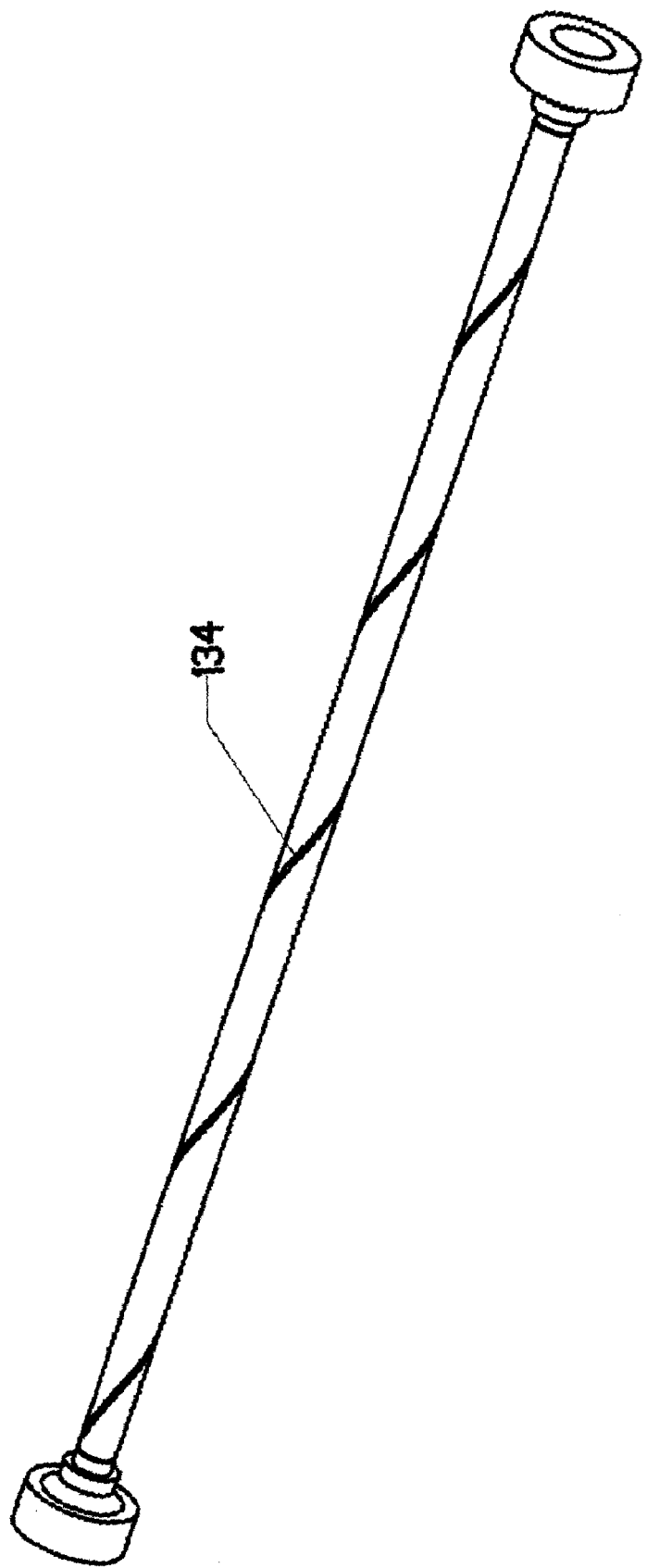
FIG. 39 is an isometric view, showing the formation of a jacket by wrapping.

Of course, a manufacturing jacket can simply be wrapped on in the form of a helical ribbon. FIG. 39 shows such a wrapped jacket 134. Manufacturing jackets can likewise be molded over some or all of the cable. FIG. 32 depicts such a manufacturing jacket 40. Thermoplastic or reactive resins can be molded in place using this technique over any desired portion of the cable. Many different shapes can also be created (such as the square cross section shown in the view).

Figure 40:
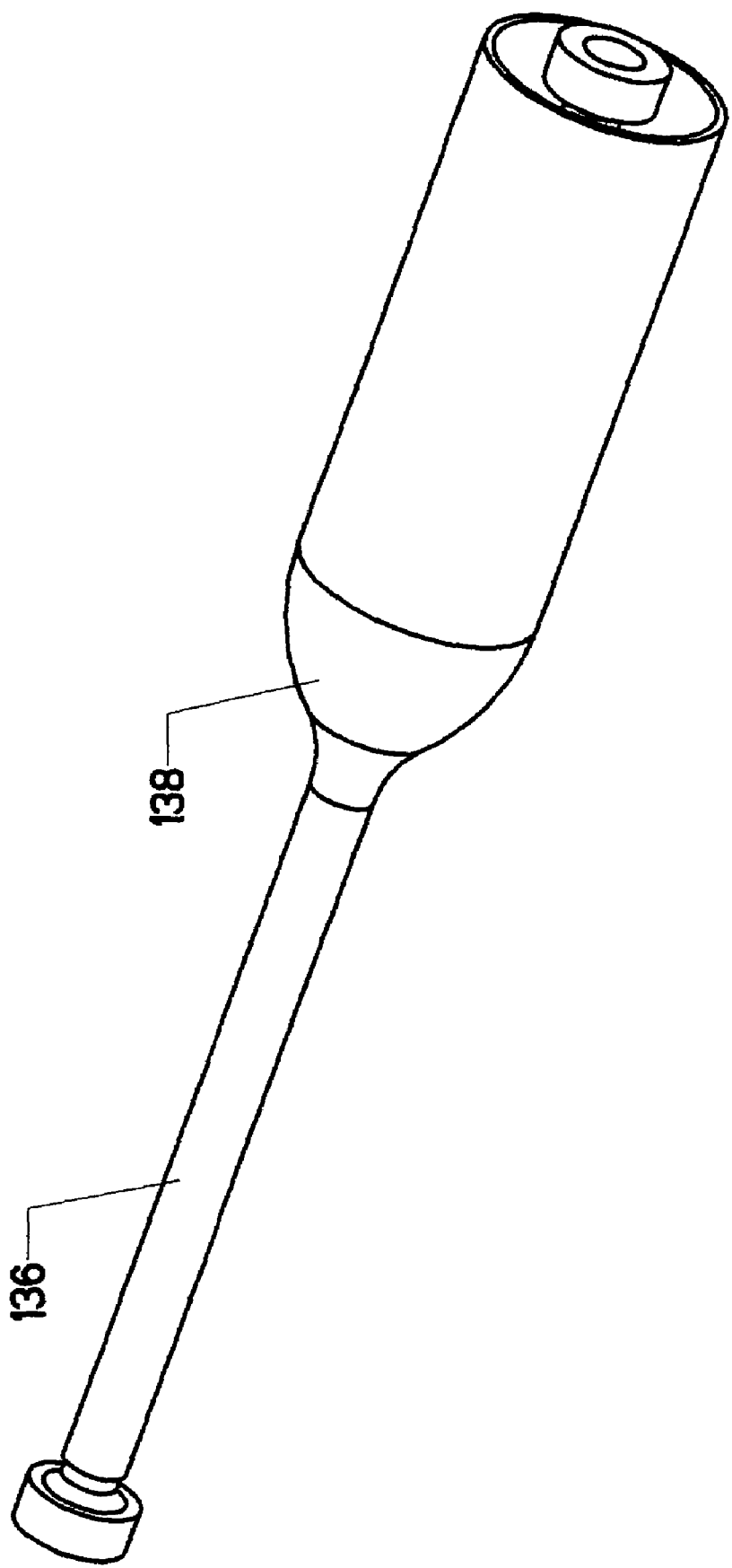
FIG. 40 is an isometric view, showing the addition of a jacket by heat shrinking.

FIG. 40 shows the application of shrinkable jacket 136 to a cable assembly. The jacket is shown being applied to a completed cable assembly (including terminations). The view therefore corresponds to the application of a jacket intended for end-use (as opposed to a manufacturing jacket). However, the same technique can be applied to add a manufacturing jacket. In the case of a manufacturing jacket, the manufacturing jacket is simply shrunk onto a length of cable having no terminations. Whether a manufacturing jacket or a jacket intended for end-use, the jacket begins with an internal diameter greater than any part of the cable or cable assembly. Once in position, heat application point 138 is moved along the jacket. The jacket material responds by shrinking significantly, thereby binding over the surface of the cable.

This view also corresponds to the application of a mechanically-expanded manufacturing jacket. The expanded portion can be produced using a tapered mandrel. The cable and manufacturing jacket are moved along together so that when the manufacturing jacket passes off the expanding mandrel it shrinks onto the cable (The mandrel approach can also be used for applying an end-use jacket).

The actual method of applying the manufacturing jacket is unimportant, so long as it produces a reasonably uniform covering that holds the cable strands in a desired state. The existence of the manufacturing jacket offers the following advantages, among others:

1. The manufacturing jacket can provide a better grip for machine handling, tensioning, etc., since the manufacturing jacket can have an improved coefficient of friction or contact patch;
2. The manufacturing jacket can provide a consistent external diameter to facilitate mechanized handling and assembly;
3. The manufacturing jacket can provide more accurate length measurements on cut cable by inhibiting strand "snap back" and uneven elongation. If a manufacturing jacket providing inward compression is used, the need to cut the cable under tension can often be eliminated;
4. The manufacturing jacket can provide, to some extent, the ability to feed the cable in compression (such as through a hole);
5. The manufacturing jacket can provide chemical, ultraviolet, and abrasive resistance during handling and storage;
6. The manufacturing jacket can prevent continuation of the strands by skin oils, moisture, and other contaminants which can subsequently interfere with the terminating processes. The manufacturing jacket can also prevent contamination of the handling machinery or operators by potting compounds and other substances which would then contaminate the cable m process or the manufacturing of subsequent cables;
7. The manufacturing jacket can form a seal to prevent potting compound from leaking out of a termination,
8. The manufacturing jacket can prevent seepage of outside contaminants (such as saltwater) into the interior of a termination;
9. The manufacturing jacket can receive marking features (such as a simple cut line or machine-readable information) and descriptive text to facilitate handling, assembly, and inventory,
10. The manufacturing jacket can prevent unwanted fraying of peripheral strands following a cut;
11. A manufacturing jacket providing inward compression can actually reduce the diameter of the cable, thereby allowing small and tighter-fitting terminations,
12. The manufacturing jacket can aid in the axial alignment of a termination by providing a smooth, constant, and rigid surface;
13. The manufacturing jacket can provide a snag-free surface for inserting and positioning terminations over the sheared end of a cable;
14. The manufacturing jacket can provide inward compression to assist in the clean cutting of the cable;
15. The manufacturing jacket can prevent unwanted strand movement and misalignment along the entire length of the cable;
16. The manufacturing jacket can increase a cable's torsional stiffness so that twisting during handling does not cause strand misalignment;
17. The manufacturing jacket can allow multiple cuts to be made anywhere along the length of the cable, and
18. The manufacturing jacket can increase the cable's axial stiffness for improved processability.

Figure 12A:
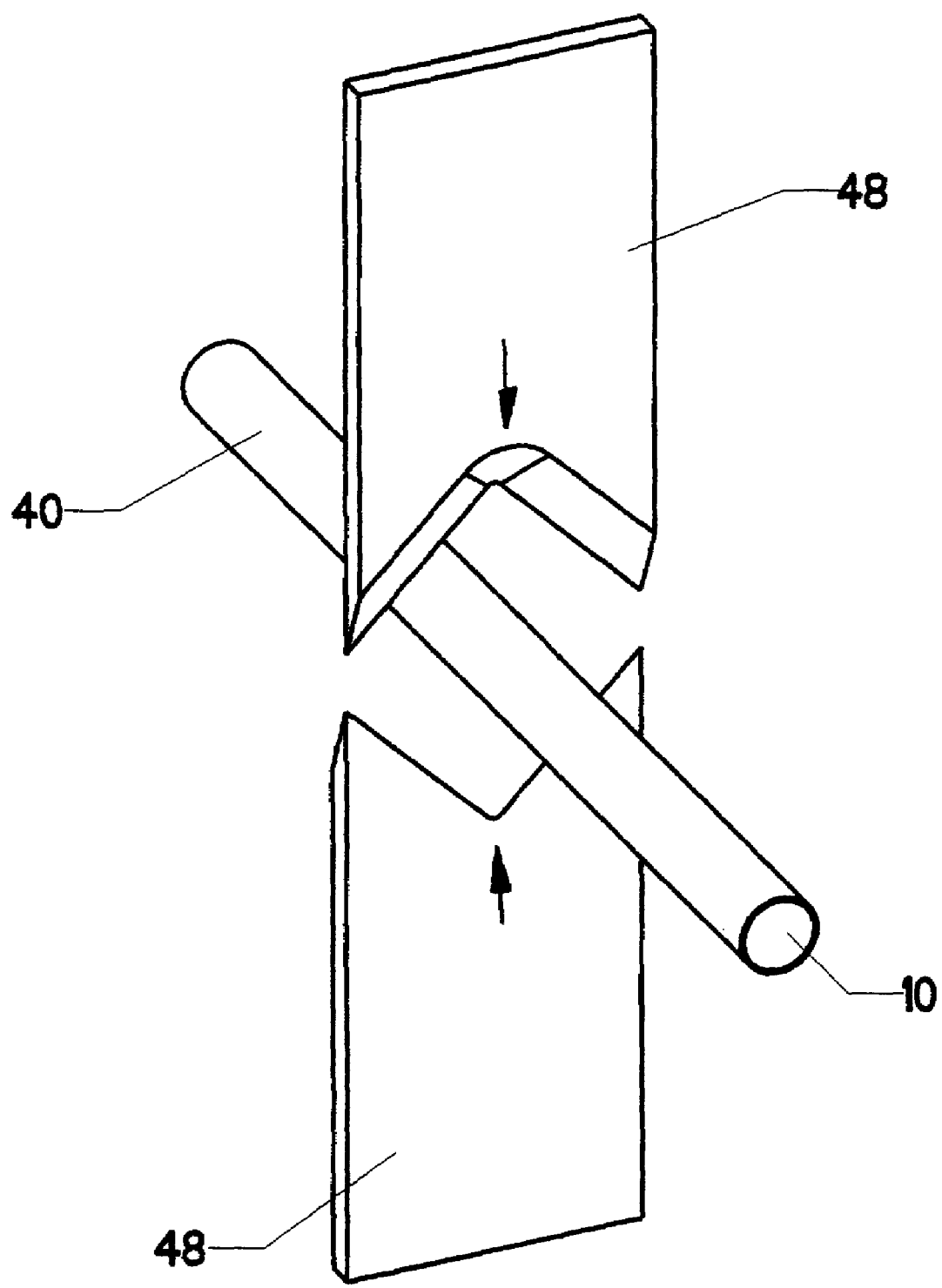
FIG. 12A is an isometric view, showing how a stranded cable with a jacket can be cut to length.
Figure 12B:
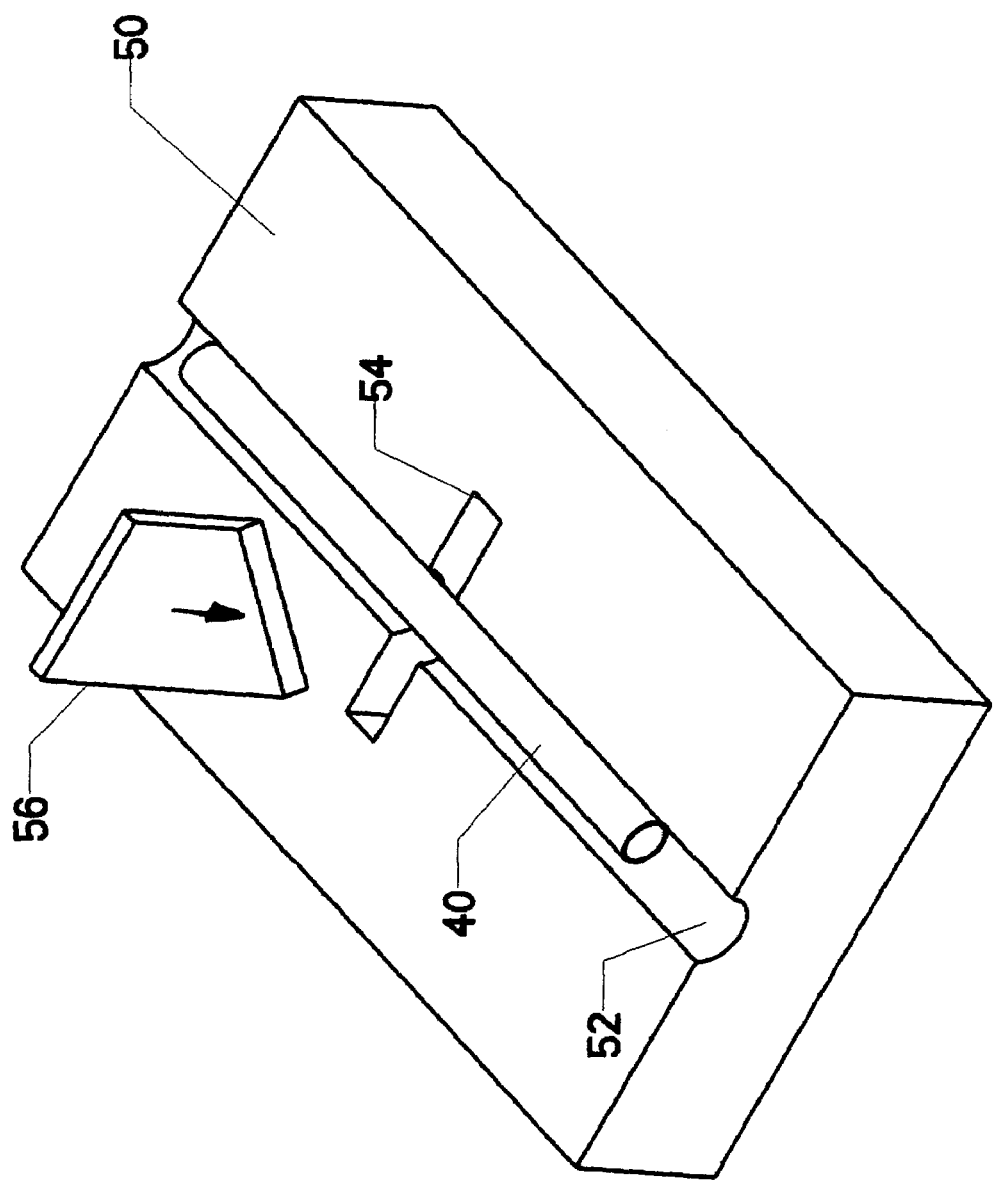
FIG. 12B is an isometric view, showing how a stranded cable with a jacket can be cut to length.
Figure 12C:
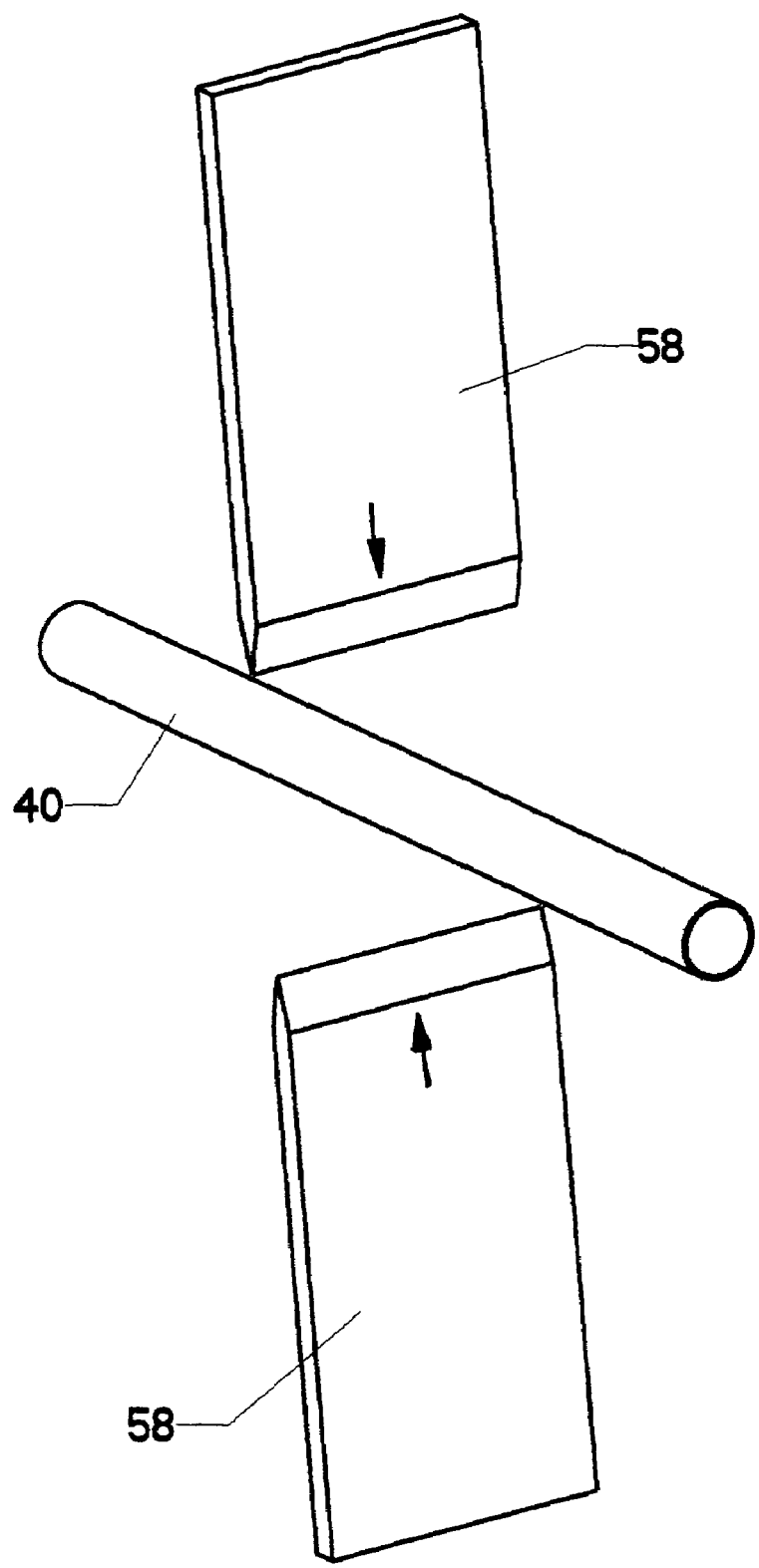
FIG. 12C is an isometric view, showing how a stranded cable with a jacket can be cut to length.

The manufacturing jacket thereby reduces potential error and allows the employment of many automated cutting, terminating, and handling processes. FIG. 12A shows a pair of opposing vee knives 48 moving together and overlapping to cut stranded cable 10. FIG. 12B shows a length of stranded cable resting in trough 52 of cutting fixture 50. Guillotine 56 descends to cut the stranded cable, passing down through knife slot 54. FIG. 12C shows a length of stranded cable being cut by a pair of opposing straight knives 58. No taping action is necessary, since the continuous manufacturing jacket encircles and holds the strands in the correct orientation. In effect, the stranded cable is "taped" along its entire length. In addition, for a manufacturing jacket applied in a molten state (such as for the extrusion example), it flows into and around the surface strands, thereby bonding to, or in some instances mechanically interlocking with, the stranded cable. The manufacturing jacket can be applied with the strands in a correctly-oriented and unstressed state. With an appropriate manufacturing jacket in place, substantial handling will not disturb the desired state of the strands. Such a manufacturing jacket holds the stranded cable in a much more stable way then the secondarily-applied tape.

Figure 13:
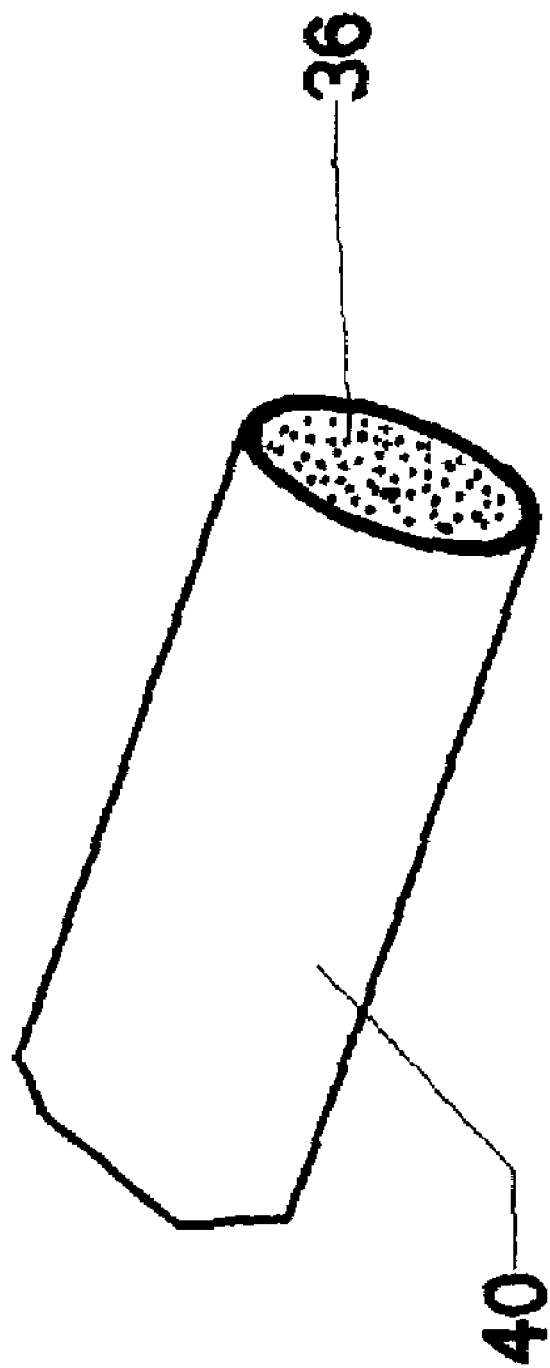
FIG. 13 is an isometric view, showing a stranded cable with a jacket cut to length.

FIG. 13 shows sheared surface 36 of a cable having a manufacturing jacket, after the stranded cable has been cut by one of the previously described methods. The reader will observe that manufacturing jacket 40 has held the strands aligned in a tightly packed bundle so that sheared surface 36 is relatively uniform.

The prior art methods of "jacketing" to facilitate cutting and terminating a cable have principally involved wrapping tape or other binding materials in the immediate vicinity of the operation. As explained previously, this is a labor and error intensive process that does not lend itself to automation or mass production.

The present invention proposes to initially cover the entire stranded cable (or at least a very large portion of it) with a manufacturing jacket. A long length of such cable will typically be manufactured. Many hundreds of feet can be stored on a spool. Other storage methods can be used, depending on the type of stranded cable, manufacturing jacket, or manufacturing equipment employed. As one example, a very rigid material can be used for manufacturing jacket 40, resulting in the production of stiff rods of stranded cable. These rods could then be stored and processed like rod stock in an automatic screw machine.

Figure 14:
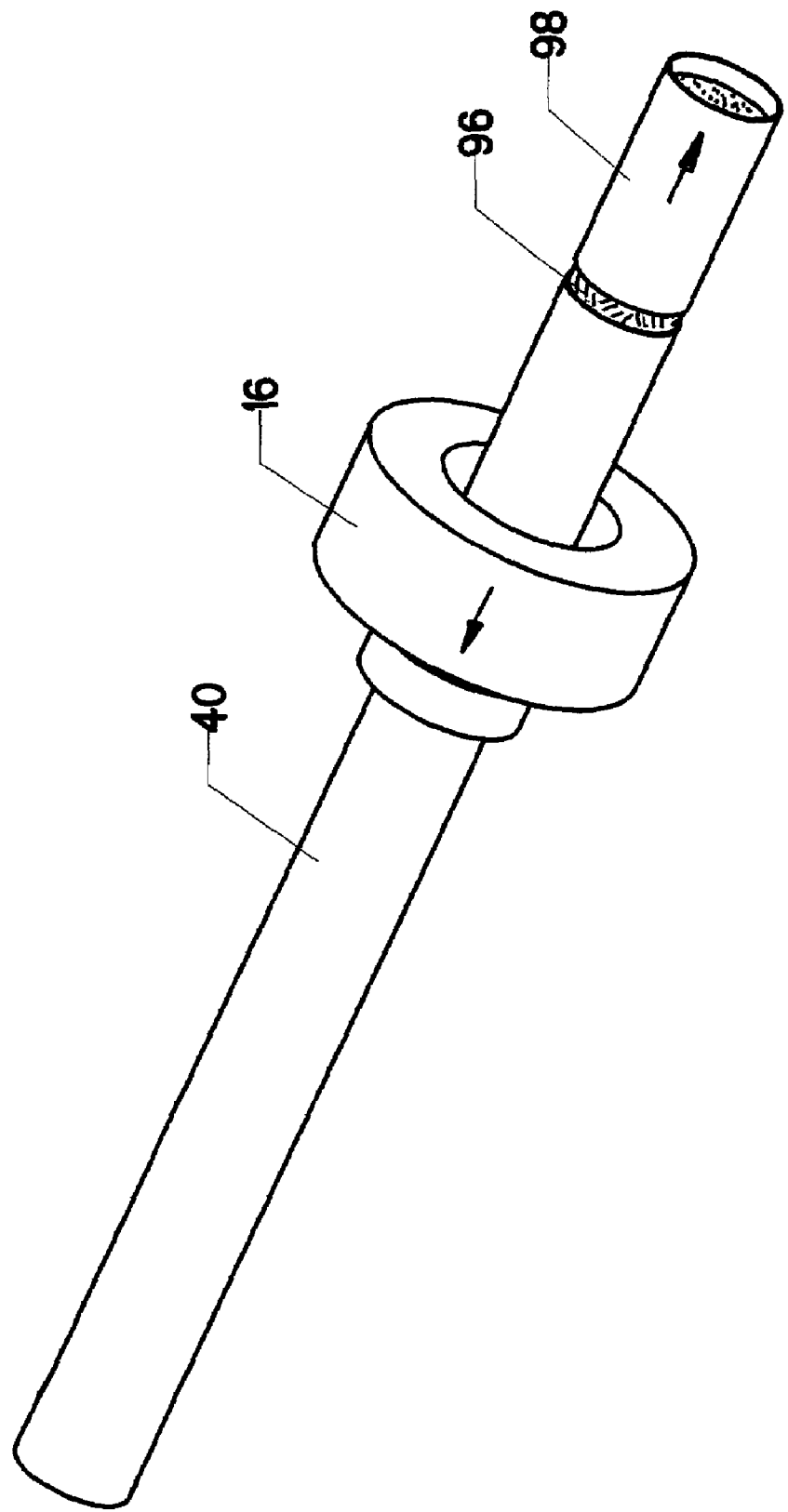
FIG. 14 is an isometric view, showing how a stranded cable with a jacket can be terminated.

In order to make a finished product, the stranded cable must be cut to a desired length. Then appropriate terminations must be installed on one or more of the two ends, or at some intermediate point. The stranded cable is cut to length as explained in the preceding. FIG. 14 shows anchor 16 being installed on one of the two ends.

The tapered bore within anchor 16 is a close fit over the diameter of stranded cable 10. The presence of manufacturing jacket 40 greatly aids the installation of anchor 16, since it prevents the strands from splaying or kinking as anchor 16 is moved into position. In the absence of the manufacturing jacket some strands tend to snag and splay outward, forming a permanent kink which may prevent the anchor's installation. Thus, with the manufacturing jacket in place, the first step is to slide anchor 16 over the sheared end and then slide it a short distance down manufacturing jacket 40, as shown.

Several different methods can be used to affix the strands to the anchor. As explained previously, potting is one common method. If potting is used, a portion of manufacturing jacket 40 must first be removed. This process will be described so that the reader can obtain an understanding of how the addition and subsequent removal of the manufacturing jacket fits into the overall manufacturing process.

Figure 15:
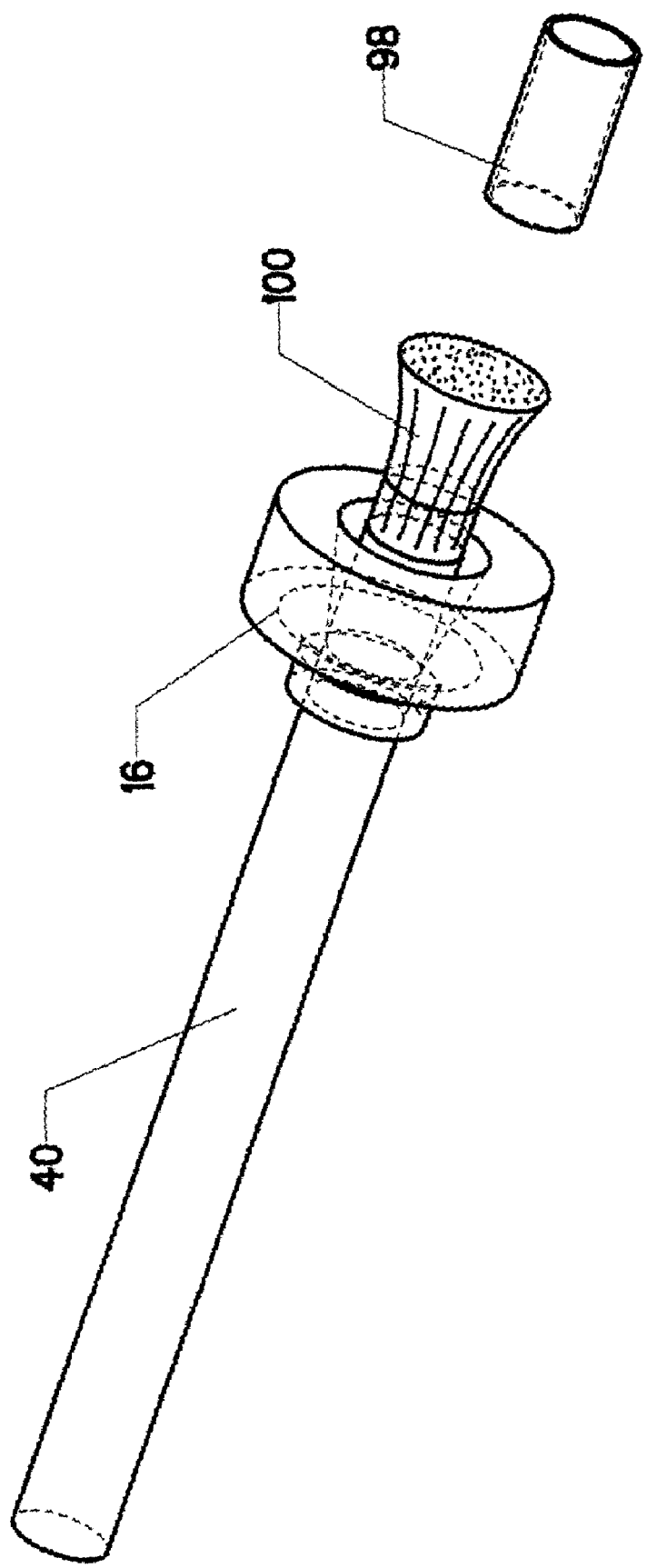
FIG. 15 is an isometric view, showing how a stranded cable with a jacket can be terminated.

As shown in FIG. 14, radial slit 96 is made around manufacturing jacket 40. Freed section 98, in the form of a short cylinder, is then pulled off to the right in the view as shown (As an alternative, radial slit 96 can be made, and then anchor 16 can be slid over the manufacturing jacket before freed section 98 is fully removed). FIG. 15 shows freed section 98 once it has been pulled free. The exposed strands are then upset outward to form splayed strands 100. Anchor 16 is then moved to the right until tapered bore 18 within anchor 16 fits tightly over splayed strands 100. The assembly is then typically hung vertically, with the stranded cable hanging down from the anchor. Potting compound is poured into tapered bore 18 to wet the strands and bond them in place.

Figure 16:
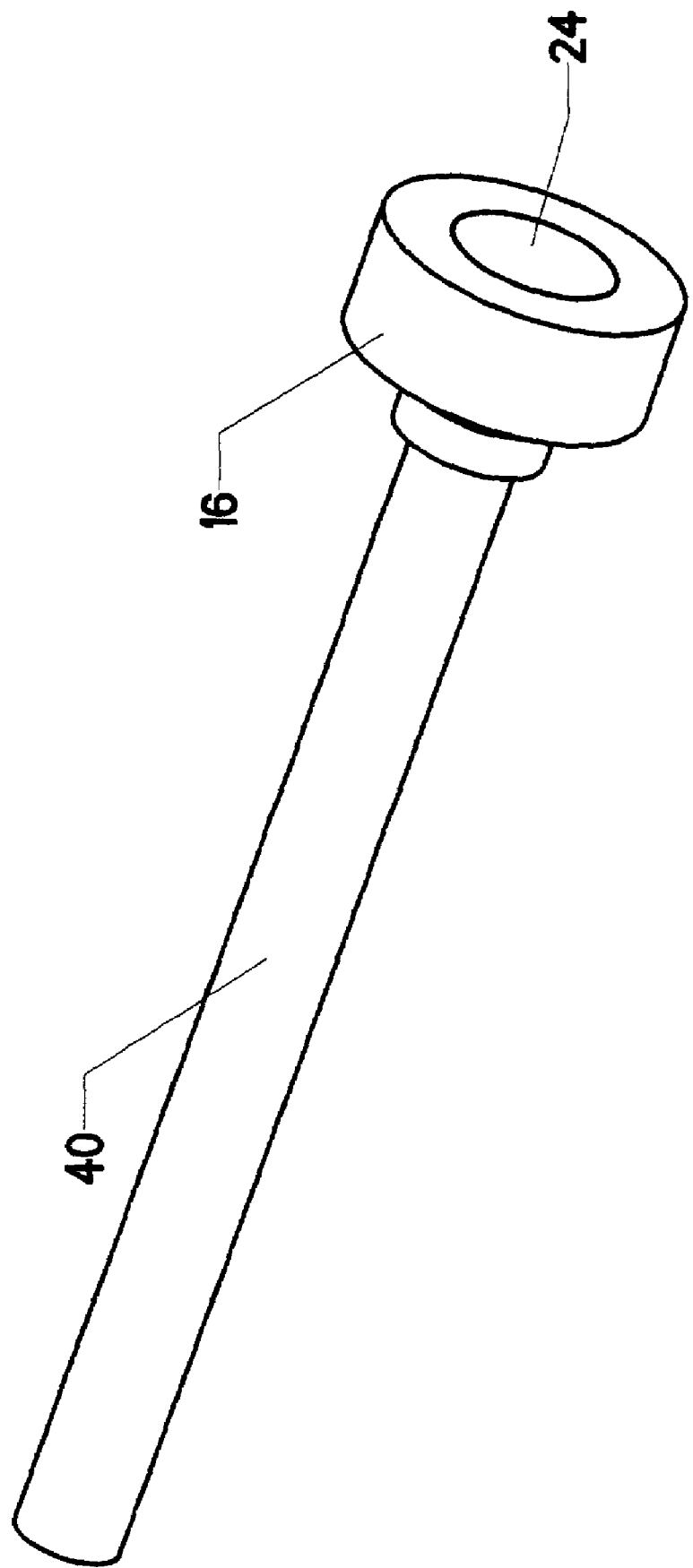
FIG. 16 is an isometric view, showing how a stranded cable with a jacket can be terminated.

The completed termination is shown in FIG. 16, with potting compound 24 being added to lock the strands in place. Although a simple flange type anchor is shown, hooks, threaded fasteners, and any other type desired can be attached to the stranded cable using the same approach.

Returning now to FIG. 15, another approach is shown. The splayed strands can be wetted before moving anchor 16 into its final position. This is helpful where the use of either very fine strands or a viscous potting compound tends to prevent wetting. The strands can be "painted" by pulling them apart and mechanically working the adhesive in. Once they are completely wetted, anchor 16 is then moved into position.

Figure 17:
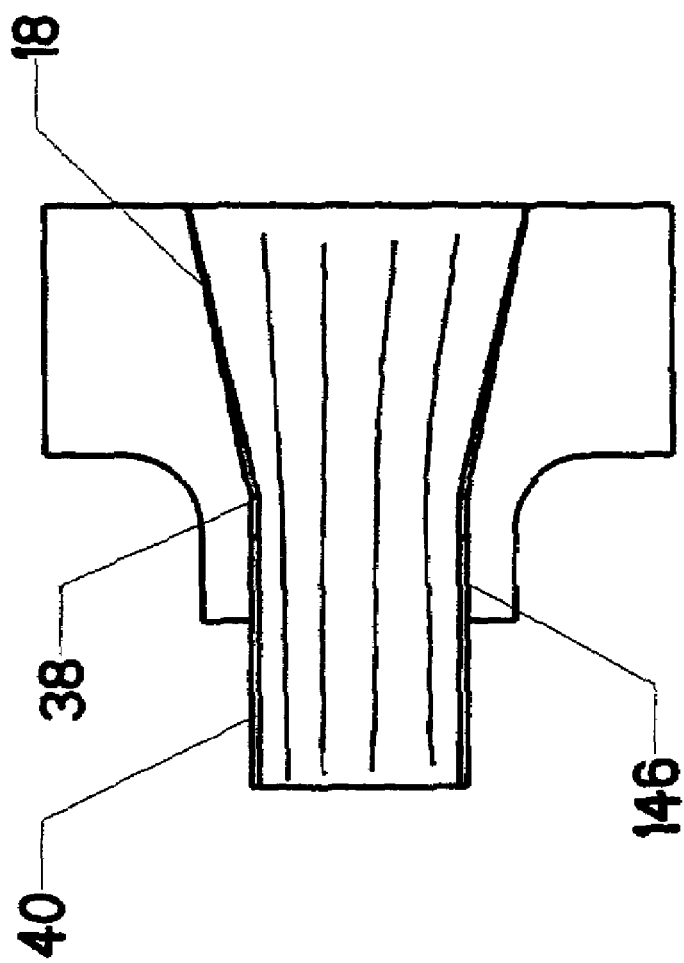
FIG. 17 is a sectional view, showing how a stranded cable with a jacket can be terminated.

FIG. 17 shows a sectional view through the completed termination. The reader will observe that the manufacturing jacket provides a precise strip length (precise length of exposed strands) and a planar transition between the unpotted and potted strands. The reader will also observe that a section of manufacturing jacket 40 remains inside tapered bore 18 to help form sealing interface 146. This feature may be highly desirable, depending on the type of potting compound, anchor, or process used. The potting compound is typically a high strength resin. In order to completely wet the very fine strands within stranded cable 10, it is desirable to use a resin having a low viscosity. However, such a resin often leaks past anchor 16 and encases the exterior of stranded cable 10. Such a leakage causes a portion of the exterior to become hard and inflexible, thereby reducing the performance of the finished product. It may also contaminate the processing equipment, resulting in contamination of other cables. The presence of sealing interface 146 prevents this leakage, even with low viscosity potting compound.

The presence of a manufacturing jacket providing inward compression in the region of sealing interface 146 is especially advantageous when the potting is done vertically, as discussed briefly before. In vertical potting, the anchor is put into the position for potting while the strands are still dry (or possibly only pre-wetted). Anchor 16 is held in place with the larger opening of tapered bore 18 facing upward. The stranded cable is hanging down below. The potting compound is then poured in the open end of tapered bore 18. A low viscosity compound is preferably used in this scenario, since it must flow in and around the strands as they are contained within the anchor. A manufacturing jacket with inward compression prevents the low viscosity potting compound from leaking past anchor 16 and down into the stranded cable itself.

Such a sealing interface is even desirable for certain non-potted fittings. As an example, a compression type fitting (described subsequently in FIG. 36) uses no potting compound and poses no concern regarding potting compound leaks. However, the sealing interface may still be useful in preventing water and other contaminants from entering the interior cavity of the termination. The sealing interface also helps to ensure axial alignment between the cable and the termination.

The reader should bear in mind that not all terminations require the removal of the manufacturing jacket to expose the end strands. Certain terminations, such as a compressible collet or clamp type, can actually compress the manufacturing jacket and the strands therein as a single unit. Thus, the exposing of the end strands should not be viewed as the only method of carrying out the invention.

Figure 18:
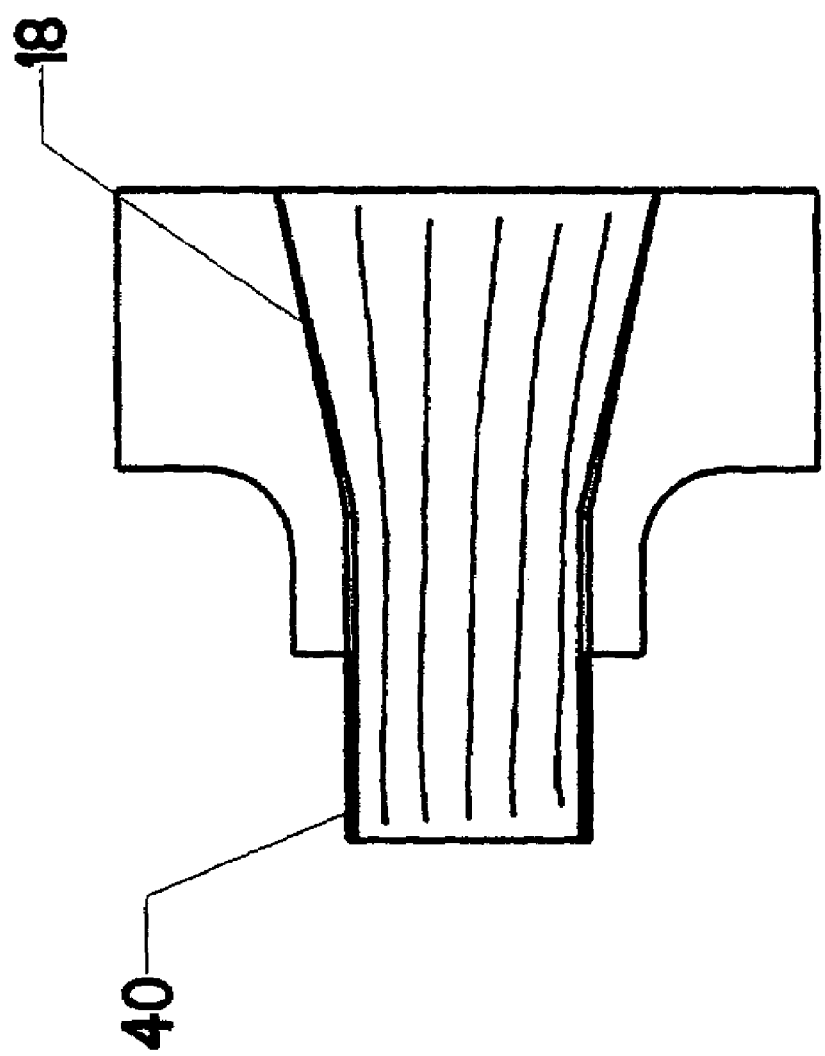
FIG. 18 is a sectional view, showing how a stranded cable with a jacket can be terminated.

FIG. 18 shows another approach, where the end of manufacturing jacket 40 is located just at the beginning of anchor 16. This approach can positively locate the termination by providing an abutment. It can also serve to reduce the size of gap 38 (shown in FIG. 17) between the strands and the anchor. It also makes the removal of the entire manufacturing jacket easier (since no portion of the jacket lies within any terminations), if full removal is desired.

Figure 19:
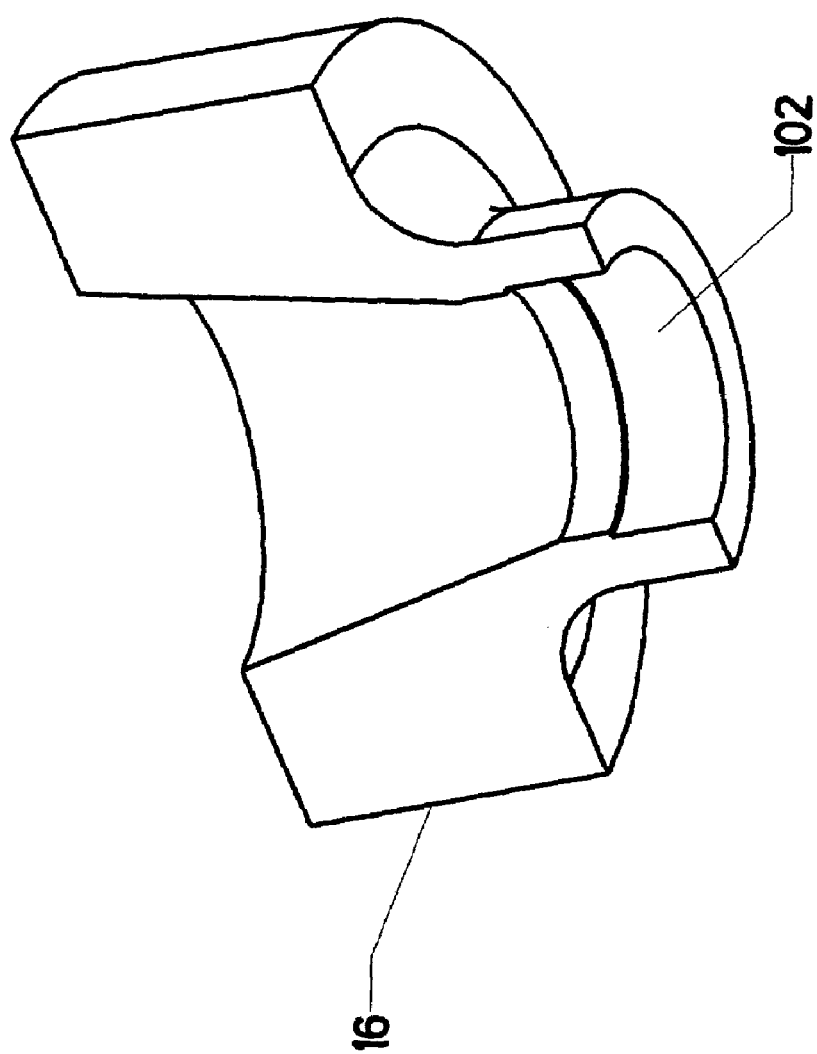
FIG. 19 is an isometric sectional view, showing a modified anchor.

For the case where a relatively thick manufacturing jacket is desired, the anchor can be modified to accommodate the additional thickness. FIG. 19 shows, in a sectional view, one such modification. Anchor 16 is modified by the addition of jacket recess 102. This allows manufacturing jacket 40 to slip within anchor 16 until it comes up against the end of jacket recess 102. This feature properly positions the end of manufacturing jacket 40, as well as eliminating or significantly reducing the presence of gap 38.

Figure 20:
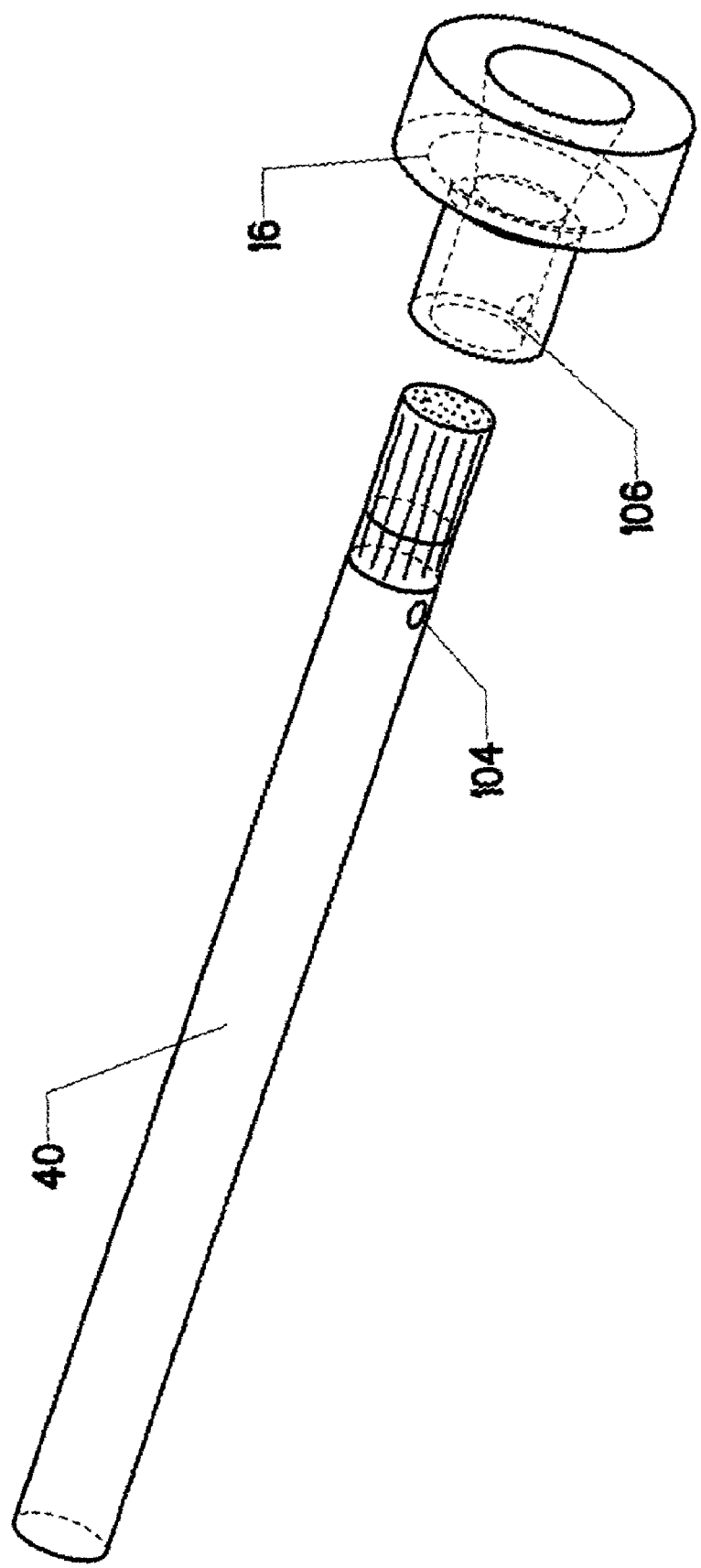
FIG. 20 is an isometric view, showing another modified anchor.

Those skilled in the art will realize that many other features can be employed to establish the proper seating depth for anchor 16. In FIG. 20, dimple 104 is located in manufacturing jacket 40. A corresponding dome-shaped protrusion 106 is formed in the side wall of tapered bore 18 in anchor 16. When anchor 16 is in the proper position, protrusion 106 will snap into dimple 104 and secure it in the proper position. The reader should bear in mind that anchor 16 would typically be located to the left of the stripped section of strands, having been slipped over manufacturing jacket 40 prior to the stripping process. It would then be moved to the right to engage the dimple and the protrusion. It has been illustrated as lying to the right only to aid visualization of protrusion 106.

Figure 21:
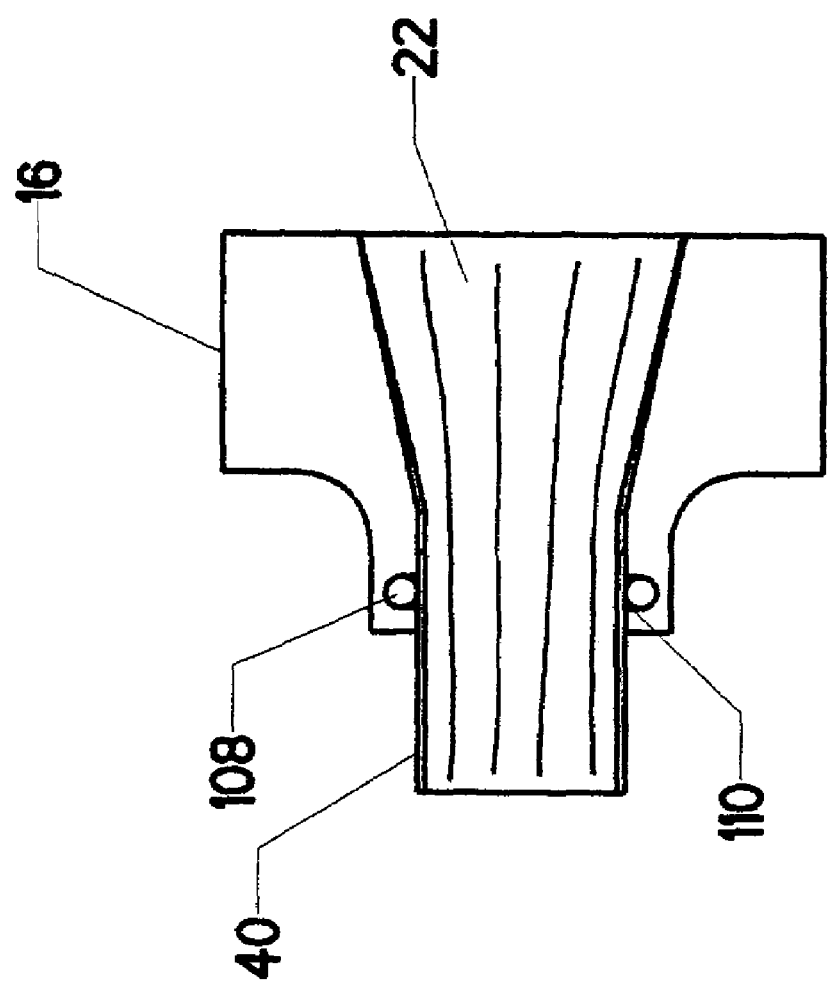
FIG. 21 is an isometric view, showing another modified anchor.

FIG. 21 illustrates another alternate embodiment for anchor 16. O-ring groove 110 has been cut into the wall of tapered bore 18, with O-ring 108 being snapped therein. O-ring 108 serves to prevent the leakage of any potting compound, and to form a seal in the completed product. It can also serve as a device for locating the termination with respect to the end of the cable.

Figure 22:
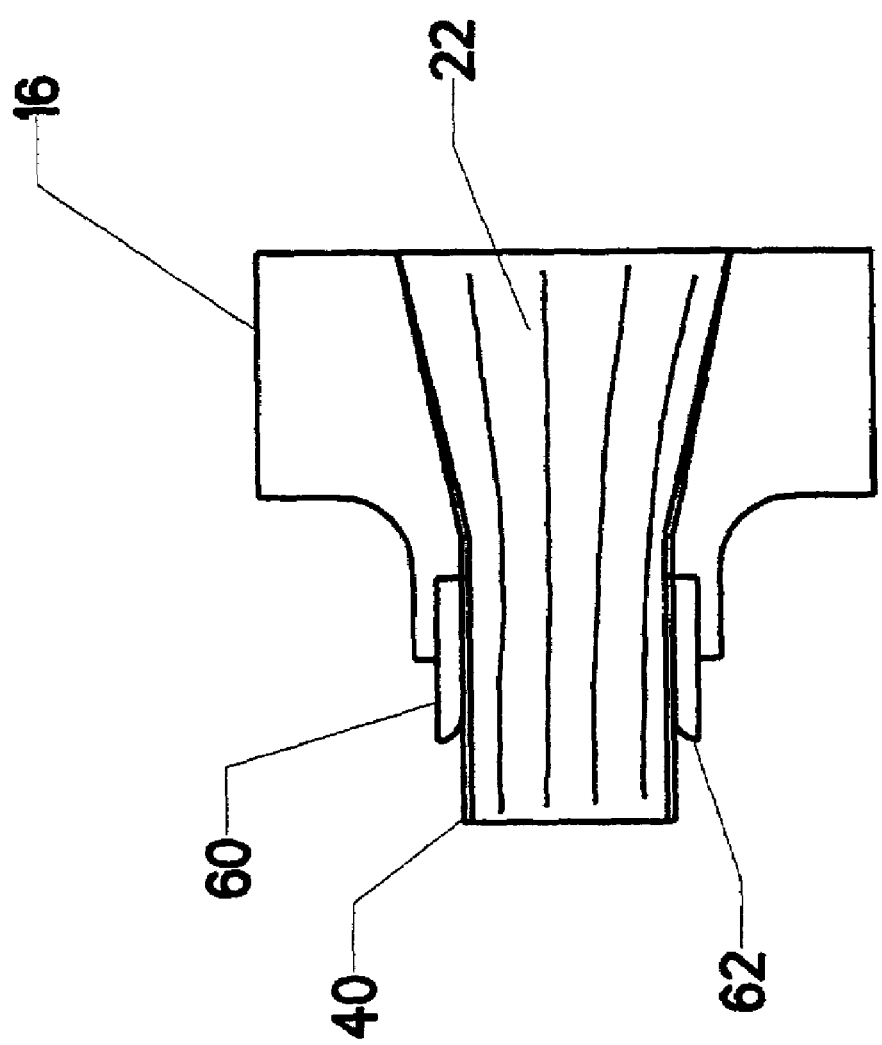
FIG. 22 is an isometric view, showing another modified anchor.

In FIG. 22, the O-ring arrangement has been replaced by a collar 60 resting within a recess in anchor 16. The portion of collar 60 facing away from anchor 16 is provided with fillet 62. Collar 60 is preferably made of a tough yet somewhat flexible material. It serves as a strain relief—cushioning the stress on the stranded cable if it is angularly displaced from anchor 16. It also tends to axially align the cable and the termination.

Figure 23:
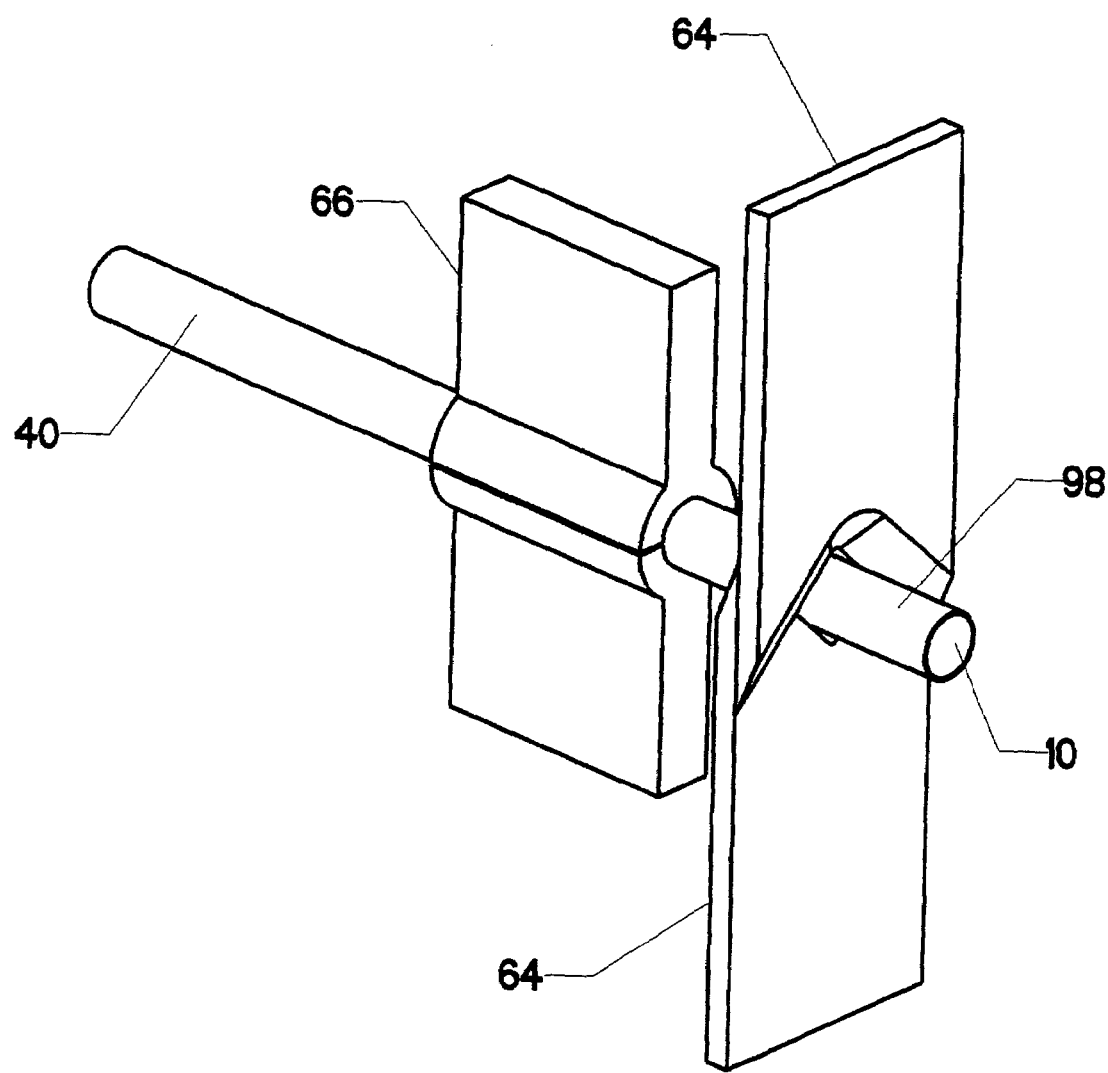
FIG. 23 is an isometric view, showing how a portion of a jacket can be stripped away.

The need for making radial slit 96 and removing freed section 98 to expose the strands for terminating has been described previously. Automated machines capable of performing this task are known. FIG. 23 shows a simplified representation of one such device. A pair of stripper knives 64 close onto manufacturing jacket 40, piercing it in four locations. While the stripper knives remain engaged, clamping mandrel 66 closes on manufacturing jacket 40 and pulls the stranded cable away from the stripper knives (or conversely, the stripper knives are pulled away from the mandrel). This action pulls freed section 98 from stranded cable 10.

Figure 24:
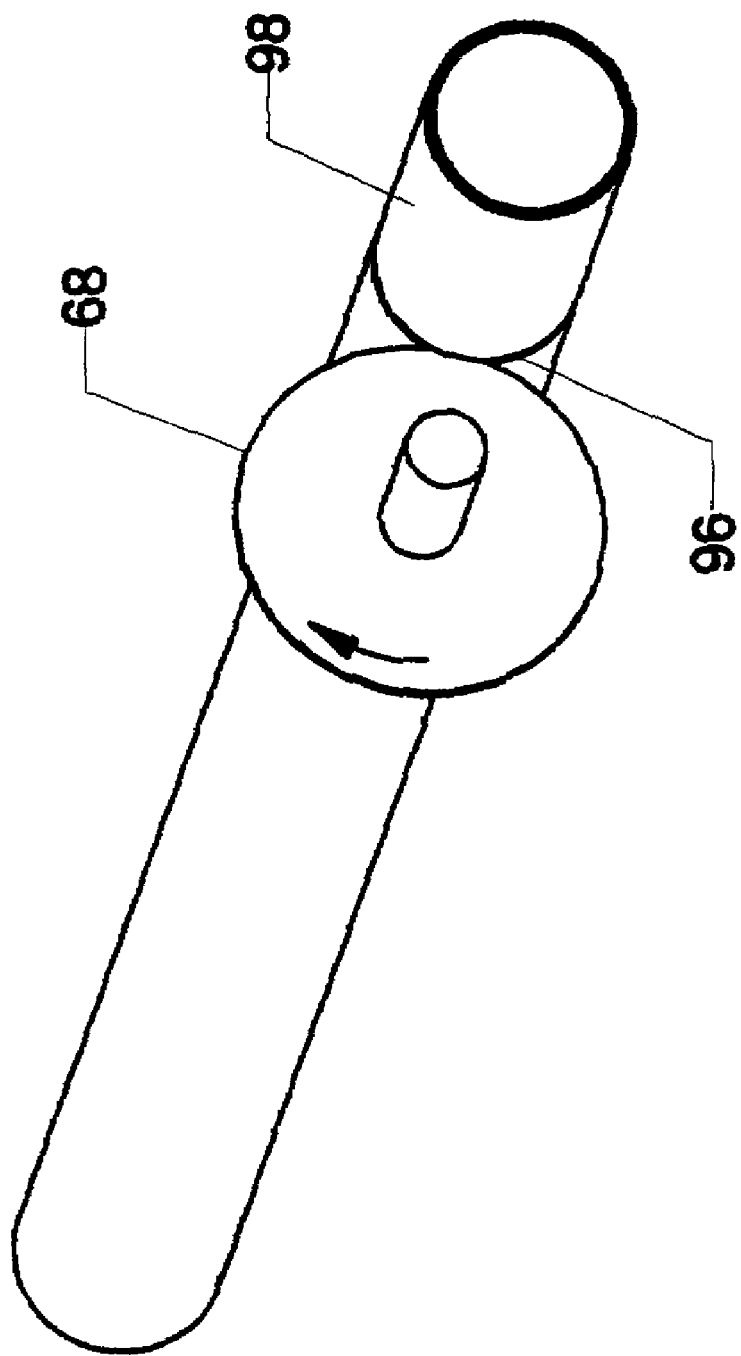
FIG. 24 is an isometric view, showing how a portion of a jacket can be stripped away.

FIG. 24 shows another approach used to accomplish this task. Rotary cutter 68 scribes radial slit 96 around the stranded cable, thereby enabling freed section 98 to be pulled free. Sensors can be used to properly position rotary cutter 68 for use with stranded cables having different diameters.

These stripping devices are specific to extruded manufacturing jackets. Other processes would be used for manufacturing jackets applied by other means. As described previously, manufacturing jackets can be created by dipping the unjacketed cable through a vat of liquid jacket material. The jacket material preferably has a low melting temperature so that the cable strands will not be damaged. This process is depicted in FIG. 37, which shows stranded cable 10 moving through liquified jacket material 130 contained in vat 128. Once the manufacturing jacket is applied, the cable goes through the normal manufacturing processes of cutting to length and adding terminations.

To provide a stripped region, the ends of the stranded cable could be exposed to a concentrated heat source, thereby removing a desired portion of the manufacturing jacket. With the terminations in place, the temperature of the entire assembly could then be raised above the manufacturing jacket material melting temperature so that the manufacturing jacket melts away, leaving the completed and unjacketed stranded cable.

Figure 25:
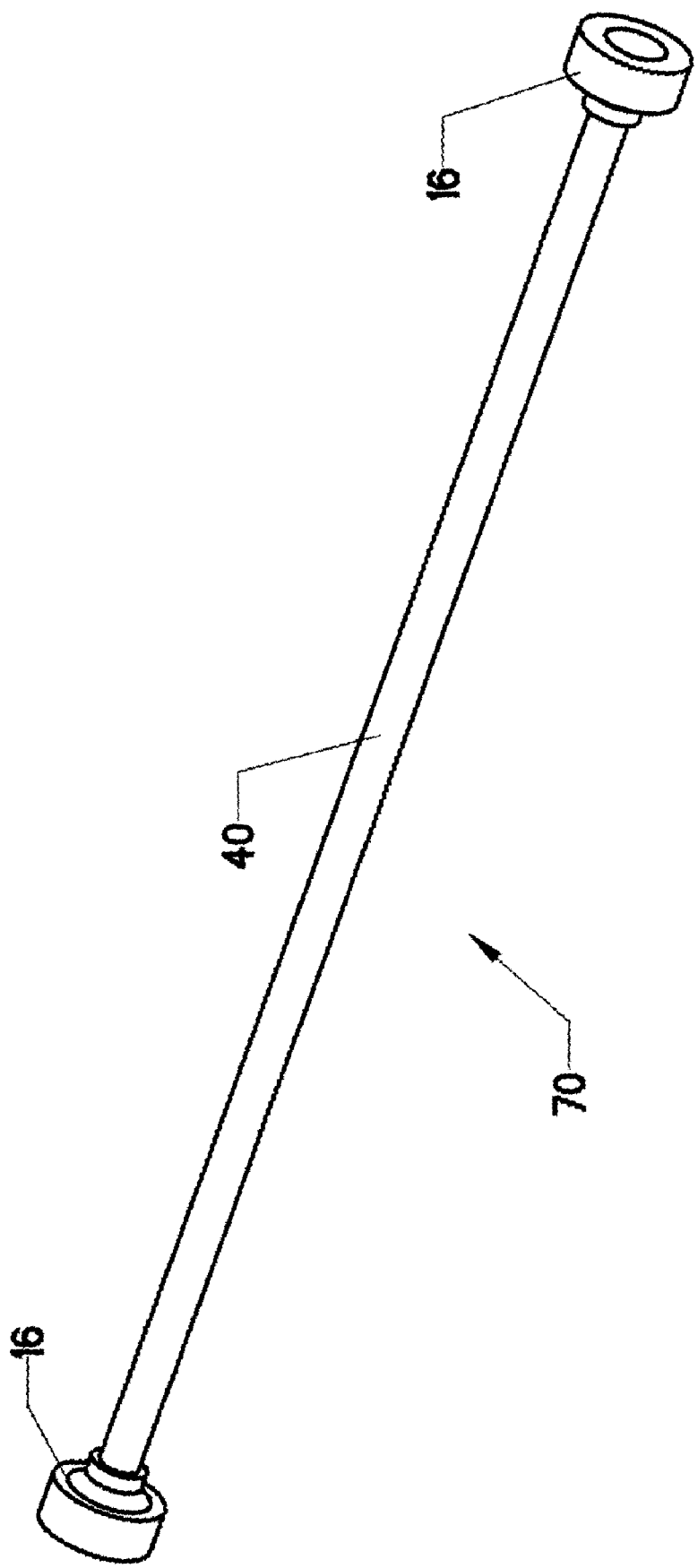
FIG. 25 is an isometric view, showing a completed assembly using a jacket.

Once a stranded cable has been cut to length and terminated on both ends, a cable assembly 70 results. One such cable assembly 70 is shown in FIG. 25. Of course, most useful cable assemblies will be much longer. A relatively short version is illustrated in order to show all the features in one view. The reader will observe that the entire length of stranded cable 10 lying between the two anchors 16 is covered by manufacturing jacket 40.

In most applications, the existence of the manufacturing jacket on the final product is undesirable. The preceding description has explained how the manufacturing jacket greatly aids in the manufacturing process. However, once the manufacturing processes are complete, the manufacturing jacket may actually become a hindrance. As one example: stranded cable 10, without a manufacturing jacket, can be very flexible. It can be passed around very small diameter pulleys without fatigue. Manufacturing jacket 40, on the other hand, may not be nearly so flexible. It does tend to fatigue as the cable is bent and flexed around pulleys and the like. Thus, once the manufacturing process is complete, it may be desirable to dispense with the manufacturing jacket, or at least a portion of the manufacturing jacket.

Additional reasons why the manufacturing jacket used in the manufacturing process would not be desirable on the finished product include:

1. The mechanical properties of the manufacturing jacket itself are ill-suited to the application (low melting temperature, excessive stiffness, etc.);

2. The manufacturing jacket restricts free strand movement, which may increase inter-strand abrasion or decrease fiber balancing and flexibility, decreasing cable life;

3. The manufacturing jacket may be cosmetically undesirable;

4. The manufacturing jacket may inhibit the addition of knotted or other terminations to be added in the field; and 5. The jacket needed for the end-use application may be undesirable for the manufacturing process.

This last example warrants further explanation. A manufacturing jacket suitable for a particular process may need to be flexible (to pass around capstans) and soft (to facilitate gripping by machinery). On the other hand, the jacket intended for the eventual use may need to have exceptional cut resistance and stiffness. Thus, in such a case, a first soft and flexible manufacturing jacket is added to the stranded cable to carry it through the manufacturing process. This manufacturing jacket is then removed. The stiff and cut-resistant jacket is then added via heat shrinking, co-extrusion, or other known processes as described herein and as shown in the drawing views pertaining to the addition of jackets. In some instances, more than one end-use jacket may be added. A third jacket can be applied over the second jacket. Or, a second jacket may be adding over one portion of the cable and a third jacket added over the remaining portion.

Figure 26:
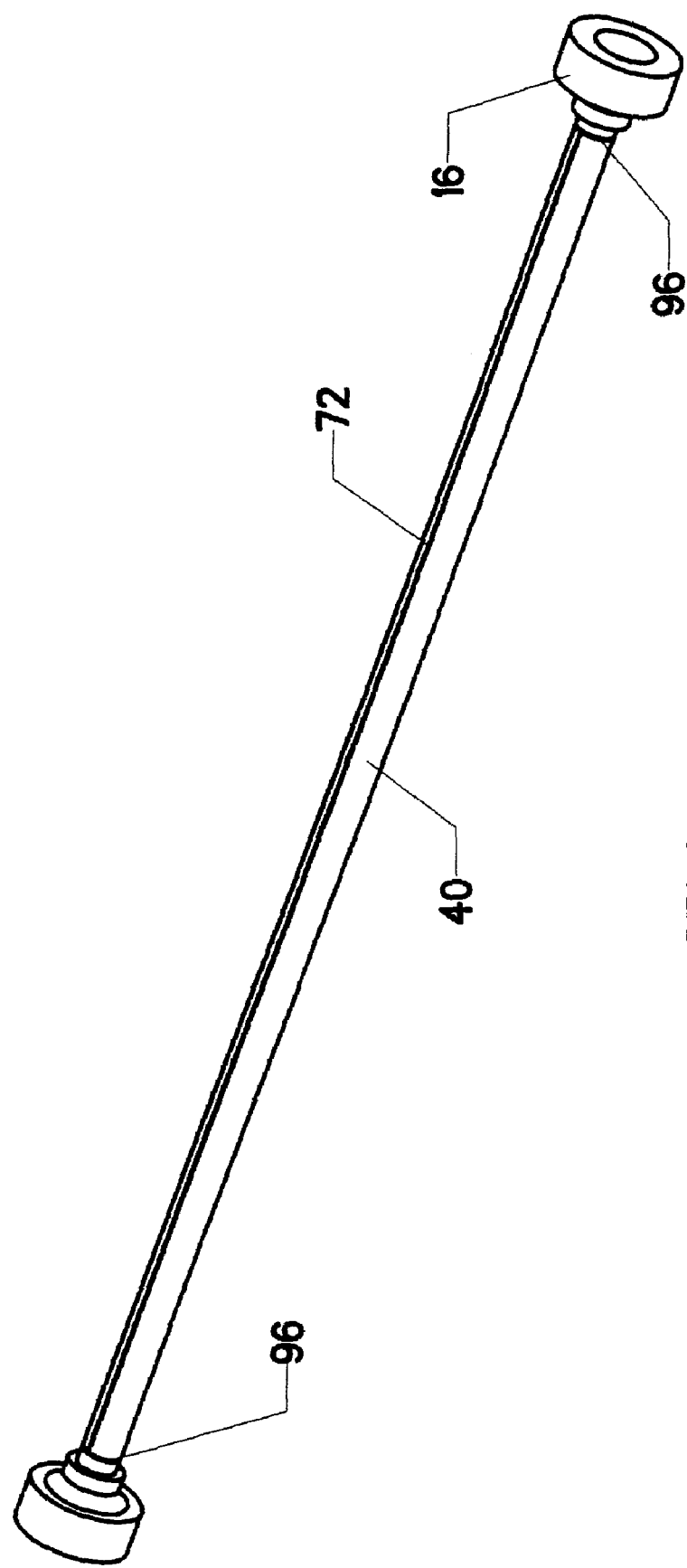
FIG. 26 is an isometric view, showing how the jacket can be removed.
Figure 27:
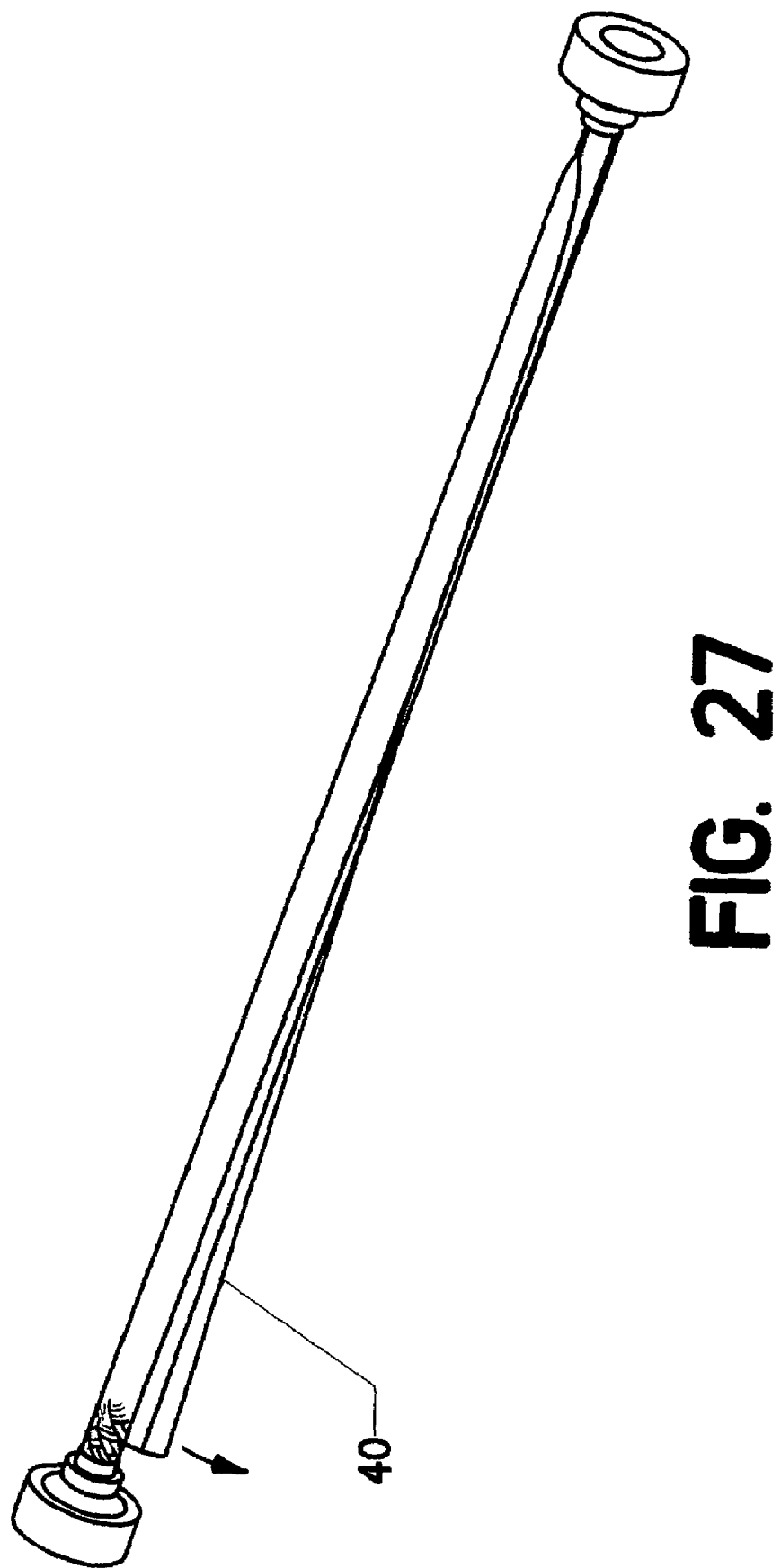
FIG. 27 is an isometric view, showing how the jacket can be removed.

For these reasons, among others, the reader will perceive that a manufacturing jacket will often need to be removed. FIG. 26 shows one method of removing manufacturing jacket 40, which is suitable for an extruded thermoplastic jacket. First, a radial slit 96 is passed around manufacturing jacket 40 near each anchor 16. This slit can be made using a rotary cutter as shown in FIG. 24. Next, axial slit 72 is cut along substantially the entire exposed length of manufacturing jacket 40. There are numerous ways to form axial slit 72. One good way is to clamp the stranded cable in a fixture having a razor cutter which protrudes into manufacturing jacket 40. One anchor is then grasped and the assembly is pulled through the fixture in order to drag manufacturing jacket 40 past the razor cutter, thereby slicing it along its entire exposed length. Manufacturing jacket 40 is then peeled away from the stranded cable, as shown in FIG. 27.

Of course, some cables have highly irregular surfaces (braided or woven cables with large strands fall into this category). For these cables, an axial slit going all the way through the jacket may cut some of the surface strands. It is therefore advisable to cut only part way through the manufacturing jacket's depth. The manufacturing jacket can then be flexed and fractured through the remainder of the depth.

Although the use of radial slits produces a nice clean edge to the manufacturing jacket near each anchor, it is not always necessary. If only the axial slit is used, the manufacturing jacket can still be torn away from the stranded cable without leaving a terribly jagged edge near the anchors. However, if the length of the retained section of manufacturing jacket needs to be well controlled (such as for use as a strain relief), then the use of the radial slits is preferable. Radial slits are also helpful when it is desirable to remove only a portion of the manufacturing jacket, since they will define a "break point" between the portion to be removed and the portion to remain. In some cases, of course, it is desirable to pull away the entire manufacturing jacket, leaving no part in the terminations. If full removal is desired, there may be little need to employ radial slits.

Figure 28:
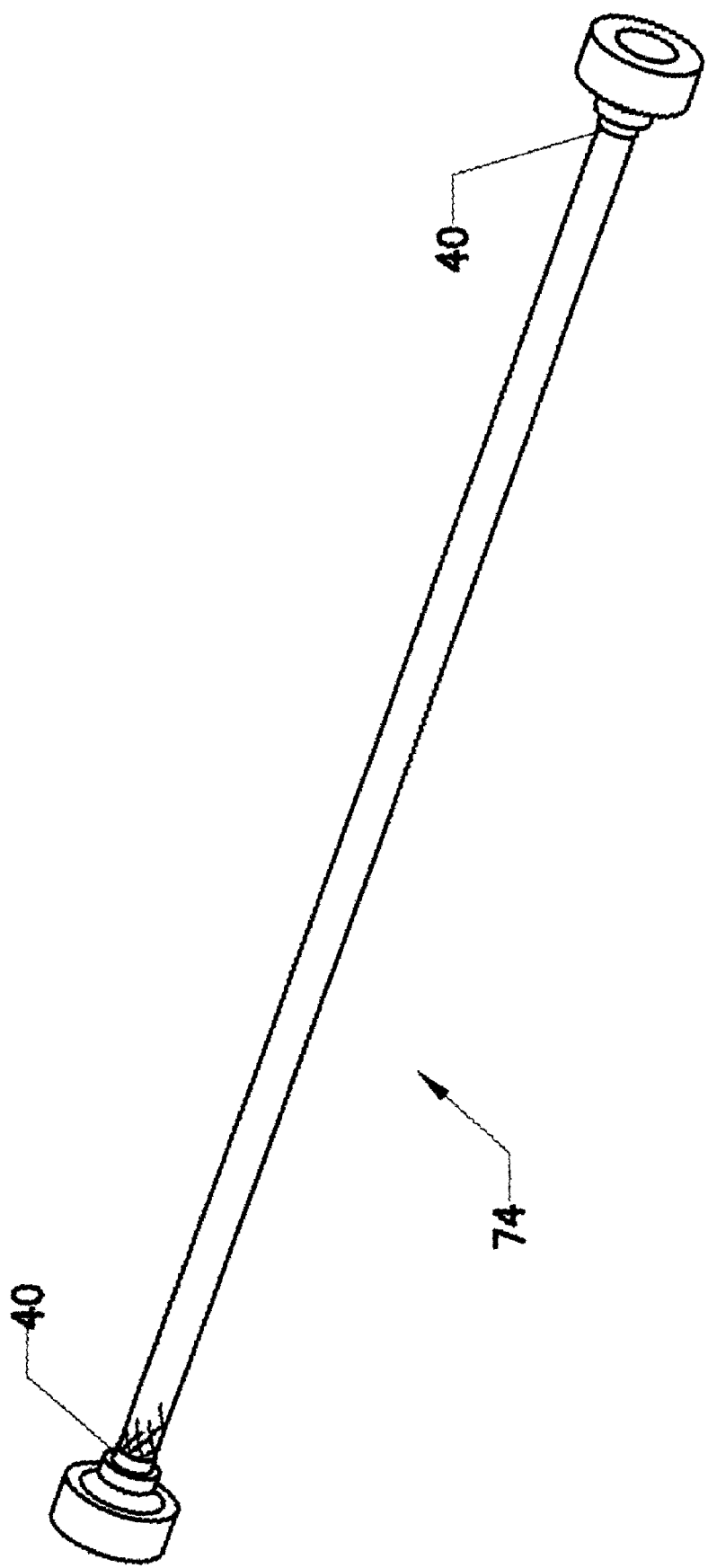
FIG. 28 is an isometric view, showing the completed cable with the jacket removed.

FIG. 28 shows the result. A short portion of manufacturing jacket 40 may be left with each anchor 16 in order to provide a strain relief, sealing function, or other desirable function discussed previously. The rest of the stranded cable is left unjacketed, however, to form unjacketed cable assembly 74. When using the radial slits to limit the regions of removal, virtually any combination of jacketed and unjacketed portions is possible. As an example, a termination could be affixed to one end, while a long jacketed region remains on the other end for the field application of a second termination at an unknown position.

Figure 29:
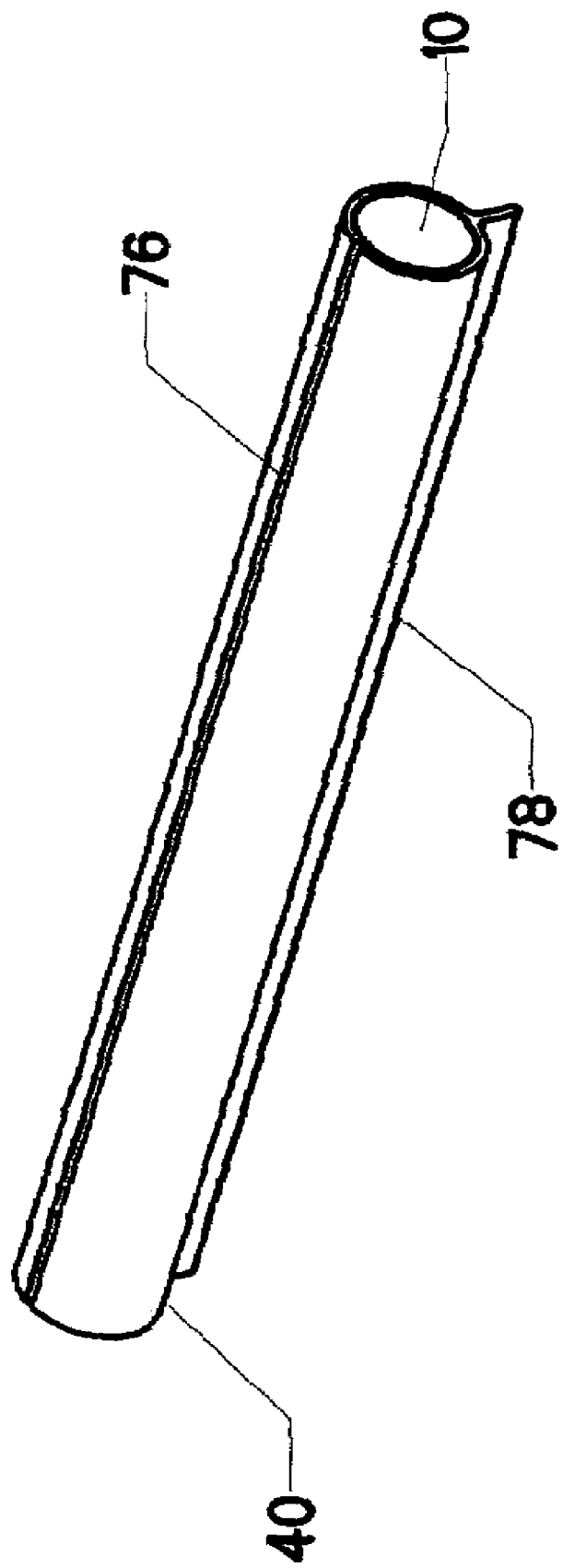
FIG. 29 is an isometric view, showing an alternate jacket.

The reader will by now appreciate that the removal of manufacturing jacket 40 requires additional steps which can be time consuming. It is possible, however, to alter the design of the manufacturing jacket in order to facilitate its removal. FIG. 29 shows one such alternate design for manufacturing jacket 40. The extrusion process has been modified so that manufacturing jacket 40 includes extruded slit 76 and extruded flap 78. Extruded slit 76 very nearly penetrates the entire depth of manufacturing jacket 40.

Figure 30:
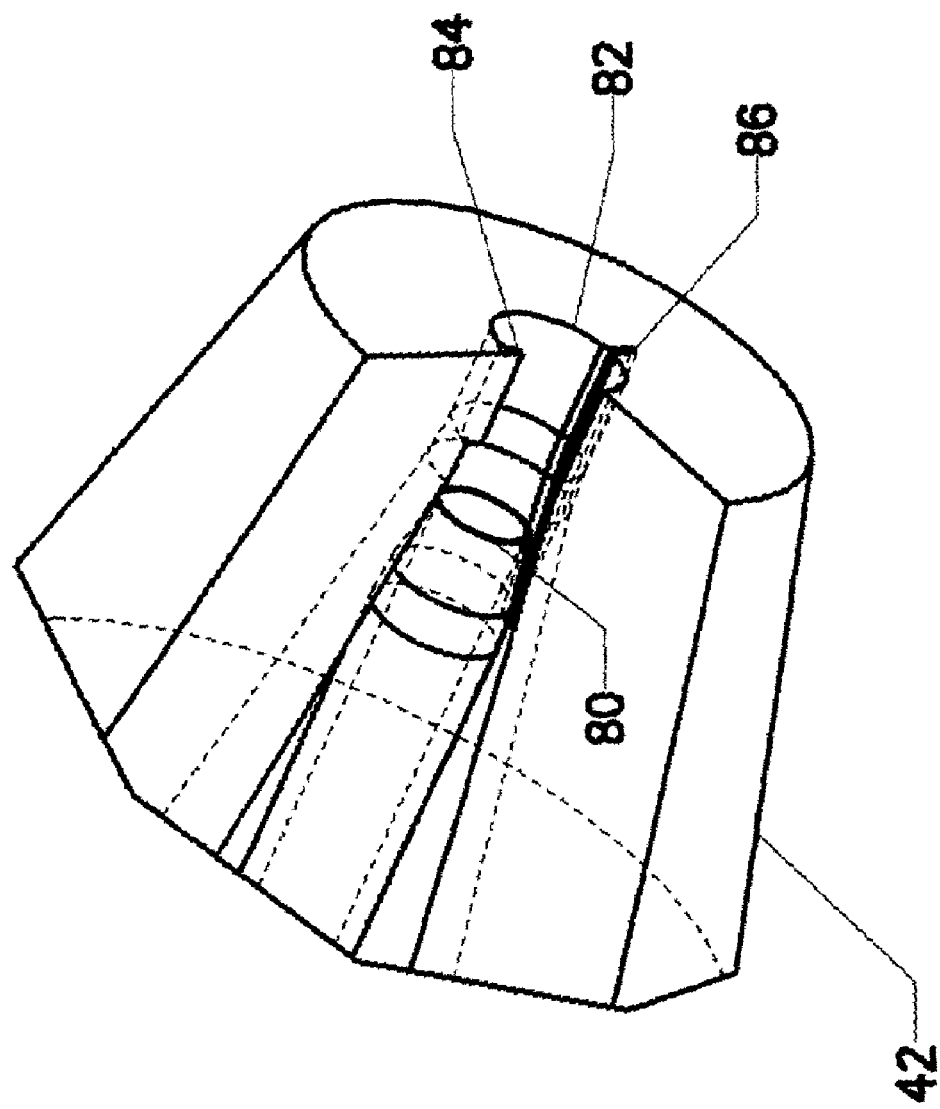
FIG. 30 is an isometric detail view, showing an alternate extruding head.

FIG. 30 shows extruding head 42, with some modifications. The reader will observe that slit former 84 has been added to form extruded slit 76 as the molten plastic is forced by it. Likewise, flap former 86 has been added to form extruded flap 78.

Figure 31:
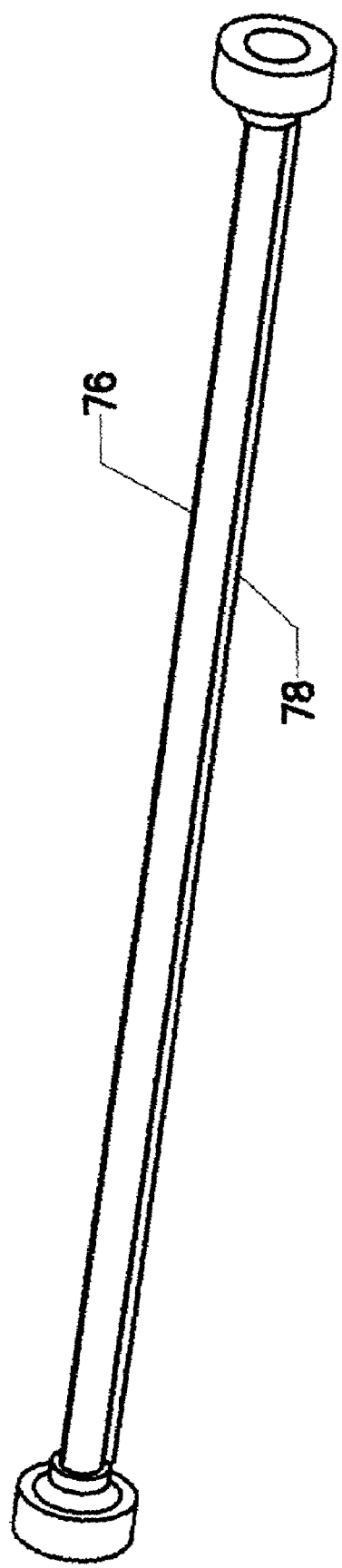
FIG. 31 is an isometric view, showing a completed cable with the alternate jacket.

A short portion of extruded flap 78 would typically be removed (such as by cutting or melting) prior to sliding anchors 16 into position. FIG. 31 shows a cable assembly using this method after the two anchors have been attached. Once in this state, the cable assembly is put under tension. The user or an automated machine then grasps extruded flap 78 and pulls it in a direction transverse to the center axis of the stranded cable. This action causes extruded slit 76 to break completely through the thickness of manufacturing jacket 40. Continued pulling on extruded flap 78 causes the jacket to separate from the stranded cable and pull free. Radial slits can be used as well, in order to provide clean breaks proximate each anchor, if desired.

From the preceding, those skilled in the art will realize that many different extruded shapes could be used for manufacturing jacket 40. These could be chosen to facilitate the automation of the manufacturing process. FIG. 32 shows an example of one such embodiment. In this case, manufacturing jacket 40 has been extruded with a square cross section—which could be used to aid automated manipulation during the manufacturing process.

Figure 33:
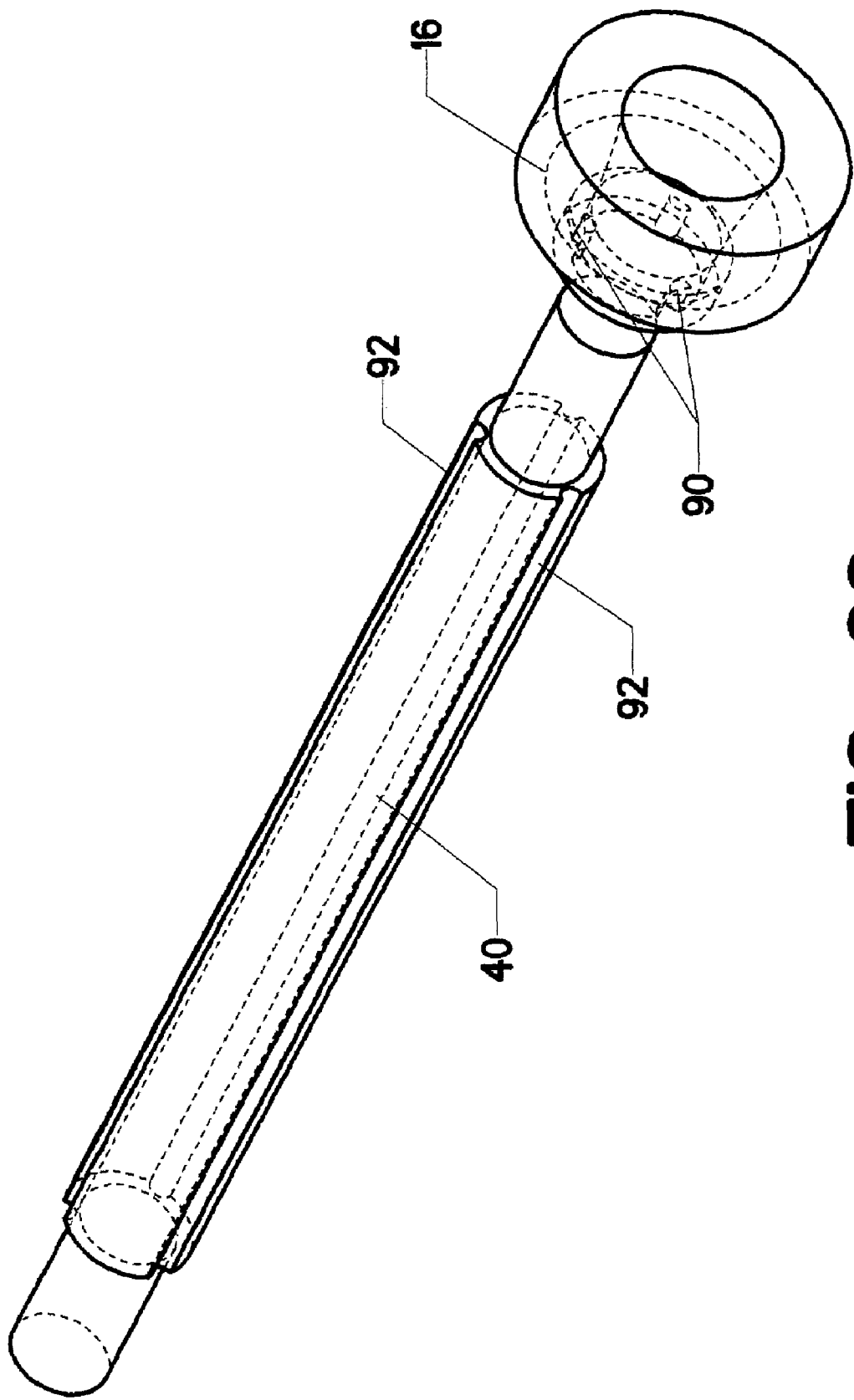
FIG. 33 is an isometric view, showing an alternate jacket and an alternate anchor.

It may also be desirable to eliminate torsional motion between the stranded cable and the anchors prior to and during the termination process. FIG. 33 shows another embodiment intended to eliminate this concern. Manufacturing jacket 40 has been extruded with three channels 92. The bore through anchor 16 has been supplemented with three corresponding ribs 90. These features interlock to prevent anchor 16 from spinning relative to stranded cable 10 (thereby potentially misaligning the strands). This feature may also serve as an anchor positioning tool.

Figure 34:
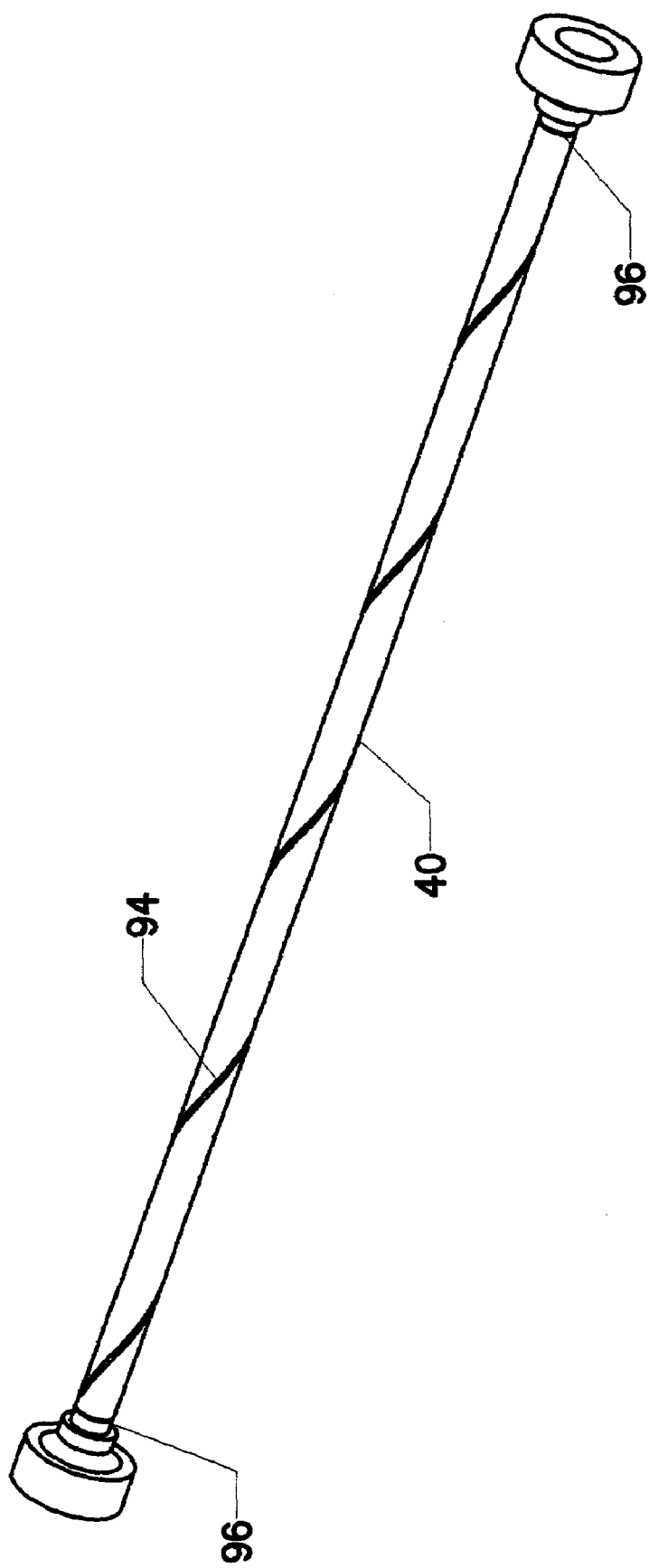
FIG. 34 is an isometric view, showing an alternate method of removing the jacket.

Finally, although radial and axial slitting of the jacket has been illustrated and described, those skilled in the art will know that numerous other patterns are possible. FIG. 34 shows the use of helical slit 94, along with a pair of radial slits 96. Once this pattern is made, the manufacturing jacket can be peeled off as a ribbon, while turning the cable assembly.

Although several mechanical examples have been given for the removal of the manufacturing jacket, numerous other methods exist. These include: (1) Abrading the manufacturing jacket away; (2) Using a brittle material which can be subsequently fractured away from the stranded cable; (3) Using a material which can be melted or burned off the stranded cable; (4) Using a material which can be chemically dissolved away from the stranded cable without damaging the stranded cable; (5) irradiating the jacket to cause fracturing (useful for radiation-sensitive materials); (6) Exposing the assembly to a near-vacuum so that a jacket made of appropriate material sublimates; and (7) Any combination of the above. The selection of the particular method for removing the manufacturing jacket is not critical.

Figure 41:
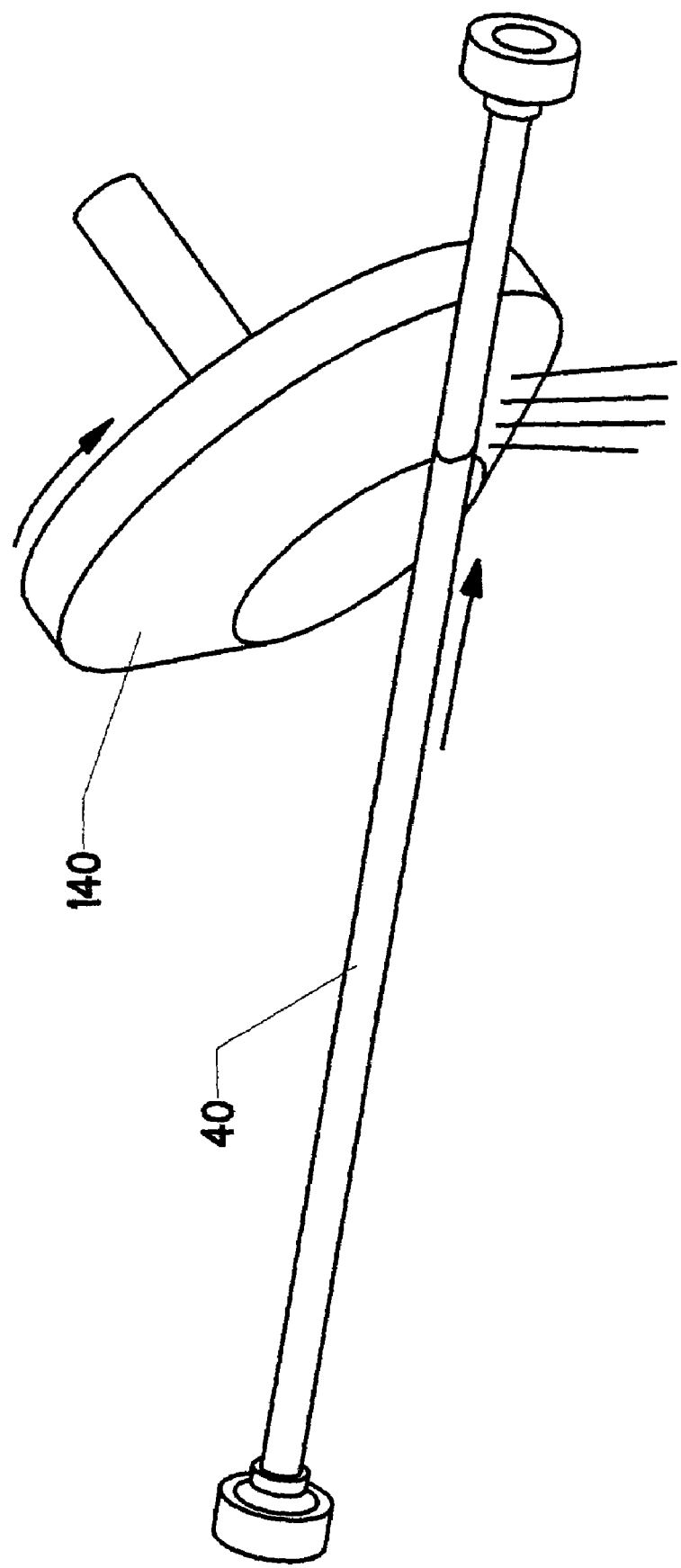
FIG. 41 is an isometric view, showing the removal of a jacket by abrasion.
Figure 42:
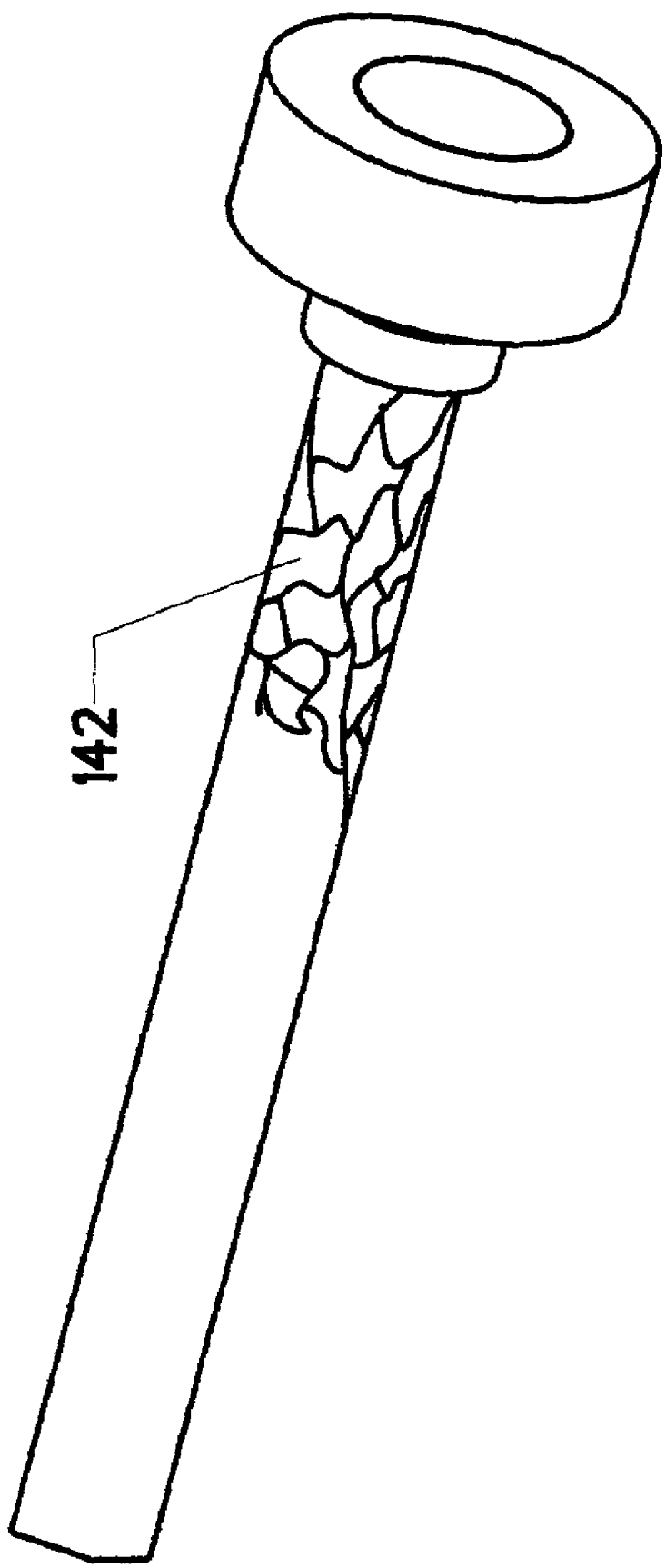
FIG. 42 is an isometric view, showing the removal of a jacket by fracturing the jacket.
Figure 43:
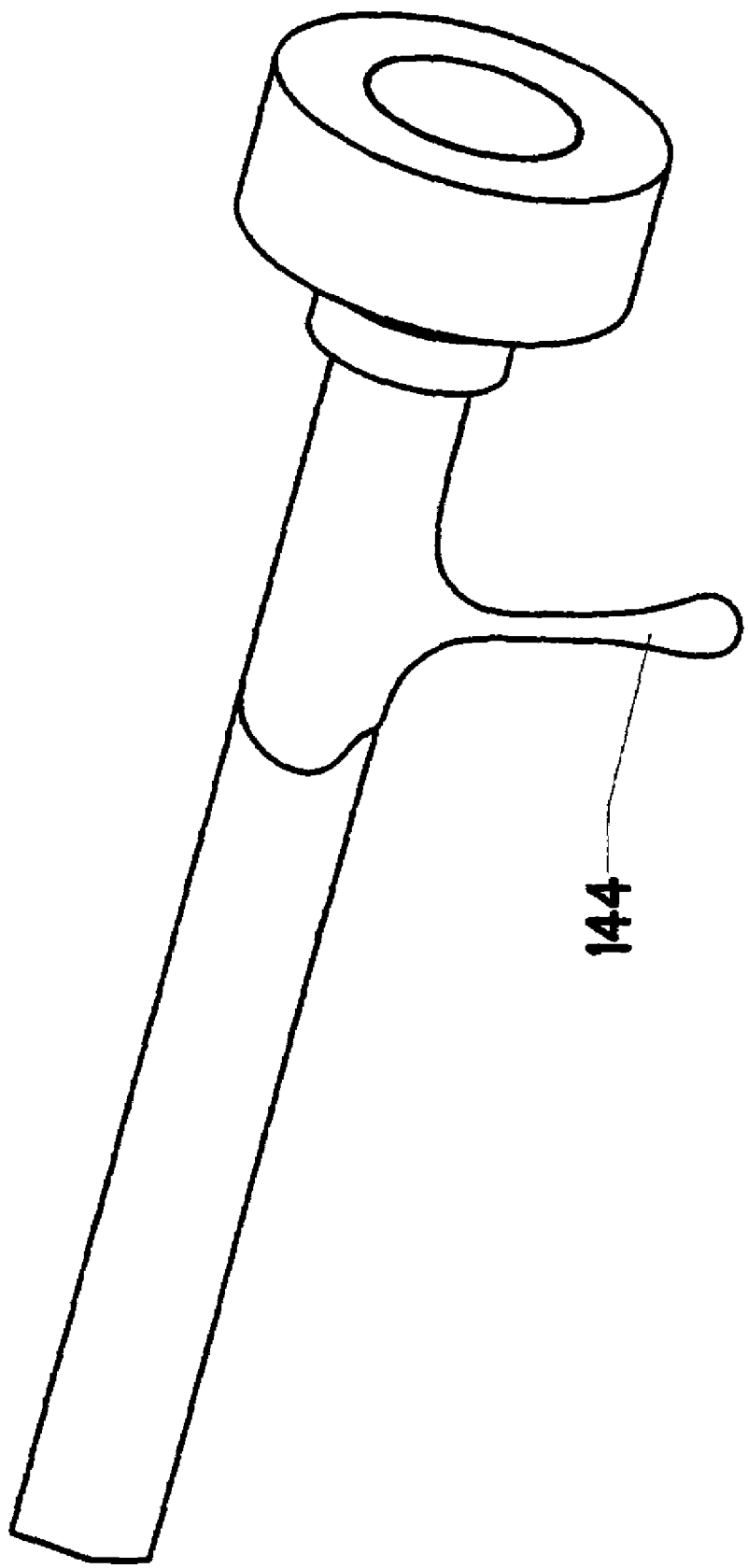
FIG. 43 is an isometric view, showing the removal of a jacket by melting.

FIG. 41 shows an abrasion-removal process. Grinding surface 140 grinds away the manufacturing jacket material as the cable is moved past. Sand-blasting would be another example of abrading away a manufacturing jacket. FIG. 42 shows a fracturing process. In this process, a brittle manufacturing jacket material is used (One good selection is a material which is pliable at ambient temperatures but greatly embrittled by cold). Once the manufacturing process is complete, the manufacturing jacket is stressed until it fractures. The fractured pieces are then pulled away from the stranded cable. FIG. 43 shows the process of melting the manufacturing jacket away. The liquid region is denoted as melted jacket 144. The manufacturing jacket material selected under this approach should have a melting temperature well below that of the other materials used in the cable assembly.

Figure 35:
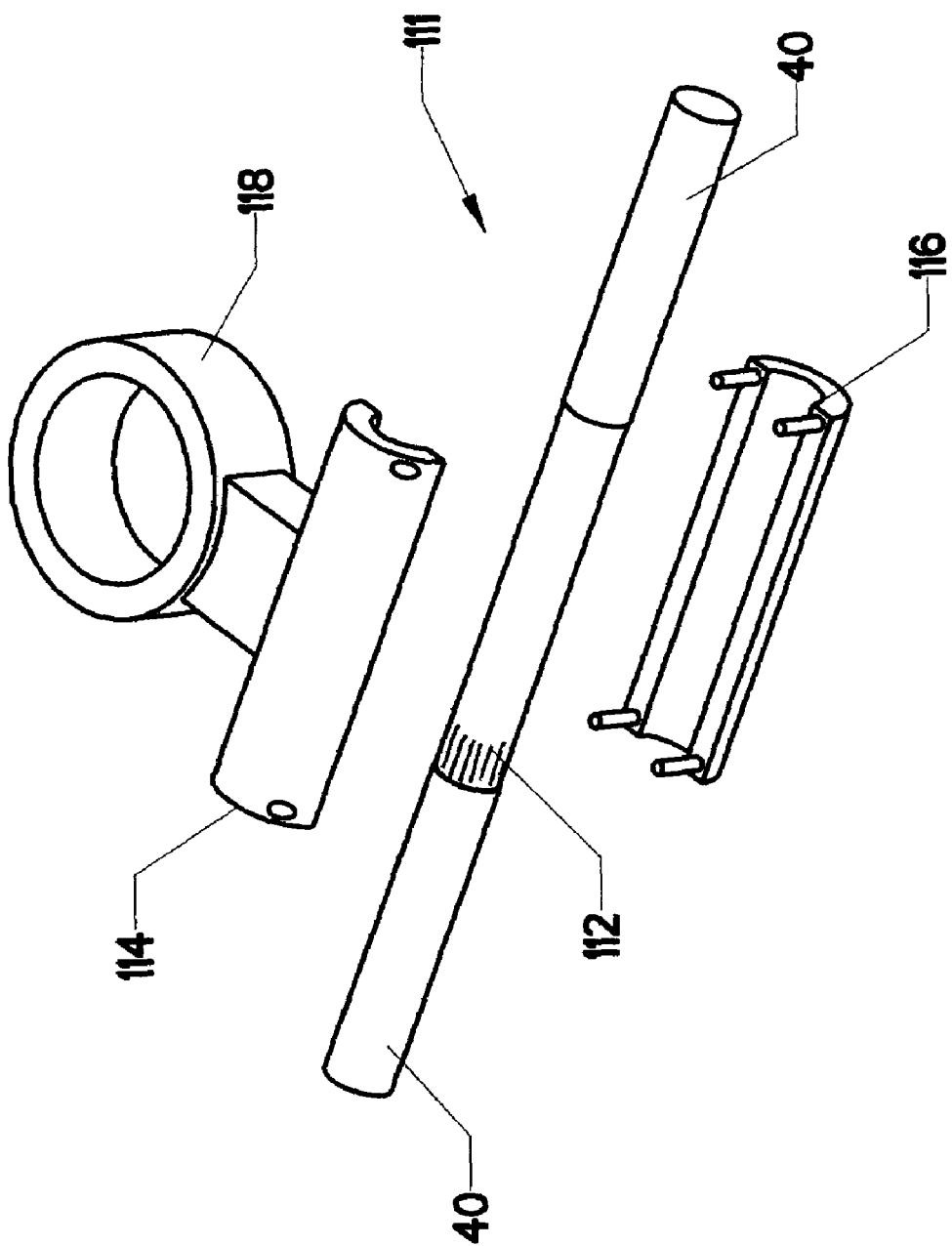
FIG. 35 is an isometric view, showing a termination designed for placement in the middle of cable.

The terminations illustrated thus far have all been located on an end of the stranded cable. Those skilled in the art will know, however, that it is sometimes desirable to provide a termination somewhere in the middle of a stranded cable. Such a termination could be useful for adjusting the tension on the stranded cable, as well as other purposes. FIG. 35 shows one such installation. A portion of manufacturing jacket 40 has been removed to reveal exposed strands 112. Center anchor 110 is then positioned for installation. Center anchor 110 is split into top half 114 and bottom half 116. Loading eye 118 is provided for the attachment of another cable.

Once the strands are exposed, potting compound is placed within the two halves of center anchor 110. It is then clamped into position and allowed to set. Excess potting compound must generally be used in order to obtain adequate wetting of the strands. The excess will be extruded out the sides of the fitting as it is clamped into place. This represents another advantage of manufacturing jacket 40—as the jacket protects the strands beneath it from being accidentally coated by the extruded potting compound. The compound will, instead, flow over the top of manufacturing jacket 40. It can then be removed.

The reader should not think of the invention as strictly applying to modern flexible stranded cables. As discussed initially, the invention is equally applicable to old technology such as wire ropes. The cutting and handling problems inherent in the manufacturing of such wire ropes can be largely ameliorated through the use of the proposed manufacturing jacket.

Although most of the examples provided have discussed a single manufacturing jacket, the reader should also be aware that two or more manufacturing jackets could be employed. A first manufacturing jacket could be used on one portion of the cable with a second manufacturing jacket on another portion. In addition, the manufacturing jackets could be layered on top of each other using any combination of the disclosed processes (spraying, heat-shrinking, etc.).

Figure 36:
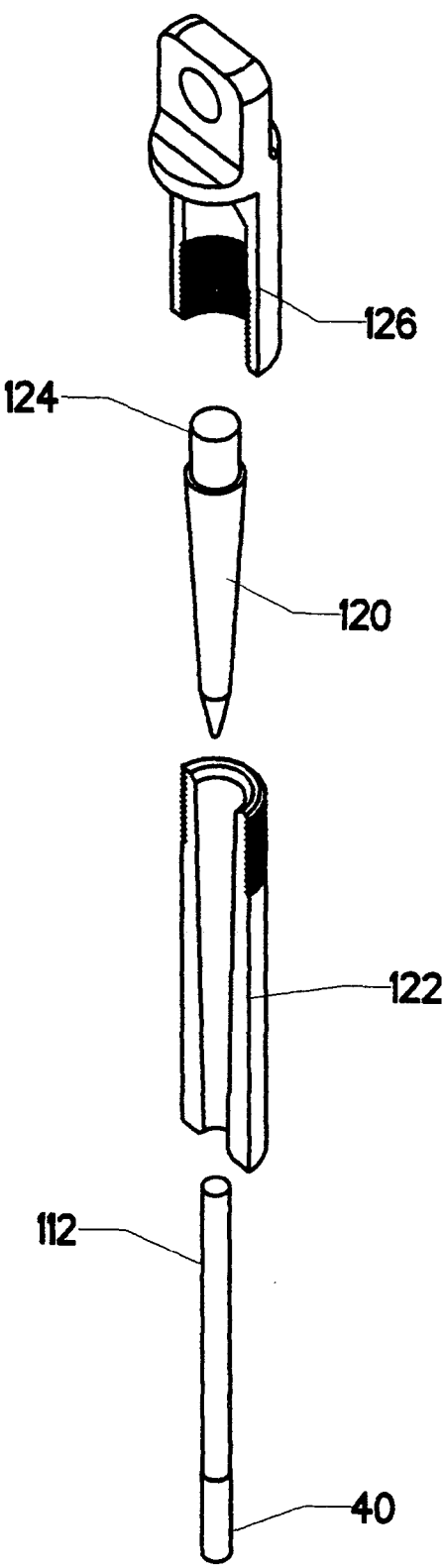
FIG. 36 is an isometric view, showing a purely mechanical prior art termination.

Likewise, the reader should not think of the invention as strictly applying to the termination methods illustrated. Although potting with liquid resins such as epoxies or polyesters is widely used, it is certainly not the only termination method available. The manufacturing jacket can be applied to any type of termination. FIG. 36 shows one type of purely mechanical termination. A larger length of manufacturing jacket 40 must be removed to reveal an extended length of exposed strands 112. Cone receiver 122 is shown in section so that its internal details can be seen. Exposed strands 122 are fed into the hollow interior of cone receiver 122 through the orifice at its lower end. The strands are then splayed outward to lie against the conical interior wall of cone receiver 122.

Next, cone 120 is inserted into the middle of the splayed strands. Clamp 126—which is also shown in section—is then threaded onto cone receiver 122 in order to clamp cone 120 against the strands. Compression cap 124 compresses as the device is threaded more tightly together. The result is that a termination is added using only frictional engagement. The manufacturing jacket is nevertheless useful. It is obviously not needed for containing potting compounds. But, all the other advantages such as uniformity of diameter and facilitation of automated equipment, still apply.

Although the preceding description contains significant detail, it should not be construed as limiting the scope of the invention but rather as providing illustrations of the preferred embodiments of the invention. Thus, the scope of the invention should be fixed by the following claims, rather than by the examples given.

The invention claimed is:

1. A method for manufacturing a stranded cable assembly having a cable made up of a bundle of strands, said cable having a first end and a second end, comprising:
    a. applying a manufacturing jacket along the entire length of said stranded cable;
    b. providing a potting compound which transitions from a liquid state to a solid state over time;
    c. providing a first anchor having an internal cavity passing therethrough;
    d. providing a second anchor having an internal cavity passing therethrough;
    e. stripping away a length of said manufacturing jacket proximate said first end of said cable and infusing a first length of said strands proximate said first end of said cable with said potting compound in said liquid state;
    f. affixing said first anchor to said first end of said stranded cable by placing said first length of infused strands within said internal cavity in said first anchor and allowing said potting compound to transition to said solid state;
    g. stripping away a length of said manufacturing jacket proximate said second end of said cable and infusing a second length of said strands proximate said second end of said cable with said potting compound in said liquid state;
    h. affixing said second anchor to said second end of said stranded cable by placing said second length of infused strands within said internal cavity in said second anchor and allowing said potting compound to transition to said solid state; and
    i. stripping away substantially all of said manufacturing jacket from said stranded cable over the portion of said stranded cable lying between said first anchor and said second anchor.

2. A method as recited in claim 1, wherein said step of stripping away substantially all of said manufacturing jacket from said stranded cable is performed after affixing said first anchor and second anchor to said stranded cable.

3. A method as recited in claim 1, wherein said manufacturing jacket is removed by:
    a. creating a first radial slit around said manufacturing jacket proximate said first anchor;
    b. creating a second radial slit around said manufacturing jacket proximate said second anchor;
    c. creating an axial slit between said first and second radial slits; and
    d. removing said manufacturing jacket between said first and second radial slits.

4. A method for manufacturing a stranded cable assembly having a cable made up of a bundle of strands, said cable having a first end and a second end, comprising:
    a. applying a manufacturing jacket along the entire length of said stranded cable;
    b. providing a potting compound which transitions from a liquid state to a solid state over time;
    c. providing a first anchor having an internal cavity passing therethrough;
    d. providing a second anchor having an internal cavity passing therethrough;
    e. affixing said first anchor to said first end of said stranded cable by
        i. placing said internal cavity of said first anchor over said manufacturing jacket and sliding said first anchor along said manufacturing jacket a distance from said first end;
        ii. removing a length of said manufacturing jacket from said first end in order to expose a first length of said strands;
        iii infusing said first length of said strands with said liquid potting compound in said liquid state;
        iv. sliding said first anchor toward said first end of said cable until said internal cavity in said first anchor surrounds said first length of strands;
        v. allowing said potting compound infused within said first length of strands to transition to said solid state;
    f. affixing said second anchor to said second end of said stranded cable by
        i. placing said internal cavity of said second anchor over said manufacturing jacket and sliding said second anchor along said manufacturing jacket a distance from said second end;
        ii. removing a length of said manufacturing jacket from said second end in order to expose a second length of said strands;
        iii infusing said second length of said strands with said liquid potting compound in said liquid state;
        iv. sliding said second anchor toward said second end of said cable until said internal cavity in said second anchor surrounds said second length of strands;
        v. allowing said potting compound infused within said second length of strands to transition to said solid state; and
    g. stripping away substantially all of said manufacturing jacket from said stranded cable over the portion of said stranded cable lying between said first anchor and said second anchor.

5. A method as recited in claim 4, wherein said manufacturing jacket is removed by:
    a. creating a first radial slit around said manufacturing jacket proximate said first anchor;
    b. creating a second radial slit around said manufacturing jacket proximate said second anchor;
    c. creating an axial slit between said first and second radial slits; and
    d. removing said manufacturing jacket between said first and second radial slits.

6. A method as recited in claim 4, wherein said step of stripping away substantially all of said manufacturing jacket from said stranded cable is performed after affixing said first anchor and second anchor to said stranded cable.

7. A method for manufacturing a stranded cable assembly having a cable made up of a bundle of strands, said cable having a first end a second end, and a middle portion between said first and second ends comprising:
   a. applying a manufacturing jacket along the entire length of said stranded cable;
   b. providing a potting compound which transitions from a liquid state to a solid state over time;
   c. providing a first anchor having an internal cavity passing therethrough;
   d. providing a second anchor having an internal cavity passing therethrough;
   e. stripping away a length of said manufacturing jacket proximate said first end of said cable and infusing a first length of said strands proximate said first end of said cable with said potting compound in said liquid state;
   f. affixing said first anchor to said first end of said stranded cable by placing said first length of infused strands within said internal cavity in said first anchor and allowing said potting compound to transition to said solid state;
   g. stripping away a length of said manufacturing jacket in said middle portion of said cable and infusing a second length of said strands in said middle of said cable with said potting compound in said liquid state;
   h. affixing said second anchor to said middle portion of said cable by placing said second length of infused strands within said internal cavity in said second anchor and allowing said potting compound to transition to said solid state;
   i. stripping away substantially all of said manufacturing jacket from said stranded cable over the portion of said stranded cable lying between said first anchor and said second anchor; and
   j. stripping away substantially all of said manufacturing jacket from said stranded cable over the portion of said stranded cable lying between said second and said second end.

8. A method as recited in claim 7, wherein said manufacturing jacket is removed by:
   a. creating a first radial slit around said manufacturing jacket proximate said first termination;
   b. creating a second radial slit around said portion of said manufacturing jacket lying between said first and second anchors proximate said second anchors;
   c. creating a first axial slit between said first and second radial slits;
   d. removing a portion of said manufacturing jacket lying between said first and second radial slits;
   e. creating a third radial slit around said portion of said manufacturing jacket lying between said second anchor and said second end proximate said second;
   f. creating a fourth radial slit around said portion of said manufacturing jacket lying between said second anchor and said second end proximate said second end;
   g. creating a second axial slit between said third and fourth radial slits; and
   h. removing a portion of said manufacturing jacket lying between said second anchor and said second end.

9. A method as recited in claim 7, wherein said step of stripping away substantially all of said manufacturing jacket from said stranded cable is performed after affixing said first anchor and second anchor to said stranded cable.

* * * * *